(12) United States Patent
Davydov

(10) Patent No.: US 11,044,120 B2
(45) Date of Patent: Jun. 22, 2021

(54) ANTENNA PORT MULTIPLEXING

(71) Applicant: Apple Inc., Cupertino, CA (US)

(72) Inventor: Alexei Davydov, Nizhny Novgorod (RU)

(73) Assignee: Apple Inc., Cupertino, CA (US)

(*) Notice: Subject to any disclaimer, the term of this patent is extended or adjusted under 35 U.S.C. 154(b) by 89 days.

(21) Appl. No.: 15/765,692

(22) PCT Filed: Jun. 23, 2016

(86) PCT No.: PCT/US2016/038971
§ 371 (c)(1),
(2) Date: Apr. 3, 2018

(87) PCT Pub. No.: WO2017/078798
PCT Pub. Date: May 11, 2017

(65) Prior Publication Data
US 2018/0278437 A1 Sep. 27, 2018

Related U.S. Application Data

(60) Provisional application No. 62/250,322, filed on Nov. 3, 2015.

(51) Int. Cl.
*H04L 12/26* (2006.01)
*H04L 25/02* (2006.01)
(Continued)

(52) U.S. Cl.
CPC ....... *H04L 25/0204* (2013.01); *H04B 7/0456* (2013.01); *H04B 7/063* (2013.01);
(Continued)

(58) Field of Classification Search
CPC .................................................. H04L 5/005
See application file for complete search history.

(56) References Cited

U.S. PATENT DOCUMENTS

8,923,203 B2 * 12/2014 Fong .................... H04J 11/0053
370/252
10,425,852 B2 * 9/2019 Kakishima ............ H04W 16/28
(Continued)

OTHER PUBLICATIONS

3GPP TS 36.211 V127.0 (Sep. 2015); "Technical Specification Group Radio Access Network; Evolved Universal Terrestrial Radio Access (E-UTRA); Physical channels and modulation (Release 12)," 136 pages.

(Continued)

*Primary Examiner* — Guang W Li
(74) *Attorney, Agent, or Firm* — Fish & Richardson P.C.

(57) ABSTRACT

Embodiments can provide an apparatus for a User Equipment (UE) for processing a Channel State Information Reference signal (CSI-RS) associated with a prescribed CSI-RS resource configuration, comprising CSI-RS resources, relating to a predetermined plurality of antenna ports; the apparatus comprising circuitry to: process data associated with the prescribed CSI-RS resource configuration relating to the predetermined plurality of antenna ports, said CSI-RS resource configuration comprising multiplexing data to provide an indication of the multiplexing of the CSI-RS signal over the CSI-RS resources; process data associated with a CSI-RS signal conveyed using the CSI-RS resources according to the CSI-RS resource configuration to support a channel estimation using the data associated with the CSI-RS signal.

23 Claims, 16 Drawing Sheets

(51) Int. Cl.
 H04B 7/06 (2006.01)
 H04L 5/00 (2006.01)
 H04B 7/0456 (2017.01)

(52) U.S. Cl.
 CPC ......... H04B 7/0617 (2013.01); H04B 7/0626 (2013.01); H04B 7/0632 (2013.01); H04B 7/0639 (2013.01); H04L 5/005 (2013.01)

(56) References Cited

U.S. PATENT DOCUMENTS

| | | | | |
|---|---|---|---|---|
| 10,498,424 B2* | 12/2019 | Noh | | H04L 5/0035 |
| 2012/0120905 A1* | 5/2012 | Ko | | H04W 72/04 |
| | | | | 370/329 |
| 2012/0287875 A1* | 11/2012 | Kim | | H04B 7/024 |
| | | | | 370/329 |
| 2013/0028217 A1* | 1/2013 | Sumasu | | H04J 11/0023 |
| | | | | 370/329 |
| 2013/0089065 A1* | 4/2013 | Koorapaty | | H04W 56/002 |
| | | | | 370/330 |
| 2013/0128860 A1* | 5/2013 | Zhang | | H04W 72/04 |
| | | | | 370/330 |
| 2013/0208604 A1* | 8/2013 | Lee | | H04L 25/0226 |
| | | | | 370/252 |
| 2015/0003271 A1* | 1/2015 | Park | | H04W 24/08 |
| | | | | 370/252 |
| 2015/0030037 A1* | 1/2015 | Ahn | | H04L 27/2655 |
| | | | | 370/503 |
| 2015/0180628 A1* | 6/2015 | Kim | | H04B 7/0667 |
| | | | | 370/336 |
| 2015/0223245 A1* | 8/2015 | Cheng | | H04W 48/16 |
| | | | | 370/329 |
| 2015/0319718 A1* | 11/2015 | Yang | | H04W 72/0406 |
| | | | | 370/252 |
| 2016/0050006 A1* | 2/2016 | Ko | | H04B 7/0634 |
| | | | | 370/329 |
| 2016/0242060 A1* | 8/2016 | Kakishima | | H04W 16/28 |
| 2016/0337178 A1* | 11/2016 | Frenne | | H04L 5/0048 |
| 2017/0134130 A1* | 5/2017 | Li | | H04L 5/0048 |
| 2017/0201307 A1* | 7/2017 | Kim | | H04B 7/04 |
| 2018/0054290 A1* | 2/2018 | Park | | H04L 5/005 |
| 2018/0115357 A1* | 4/2018 | Park | | H04B 7/04 |
| 2018/0212662 A1* | 7/2018 | Ren | | H04B 7/06 |
| 2019/0191444 A1* | 6/2019 | Park | | H04B 7/0626 |

OTHER PUBLICATIONS

3GPP TS 36.211 V13.0.0 (Dec. 2015); "Technical Specification Group Radio Access Network; Evolved Universal Terrestrial Radio Access (E-UTRA); Physical channels and modulation (Release 13)," 141 pages.

3GPP TS 36.212 V12.6.0 (Sep. 2015); "Technical Specification Group Radio Access Network; Evolved Universal Terrestrial Radio Access (E-UTRA); Multiplexing and channel coding (Release 12)," 95 pages.

3GPP TS 36331 V13.0.0 (Dec. 2015); "Technical Specification Group Radio Access Network; Evolved Universal Terrestrial Radio Access (E-UTRA); Radio Resource Control (Rrc); Protocol specification (Release 13)," 507 pages.

International Search Report and Written Opinion for International Patent Application No. PCT/US2016/038971 dated Sep. 15, 2016; 12 pages.

Samsung; "NZP CSI-RS configuration and RE mapping for class A CSI reporting," 3GPP TSG RAN WG1 Meeting #82bis, R1-155483, Agenda Item: 7.2A.2.1; Malmo, Sweden, Oct. 5-9, 2015; 8 pages.

ITL Inc.; "Details on 12- and 16-port NZP CSI-RS resource configuration for FD-MIMO," 3GPP TSG RAN WG1 Meeting #82bis, R1-155773, Agenda Item: 7242.1; Malmo, Sweden, Oct. 5-9, 2015; 4 pages.

3GPP, "Technical Report; Study on Elevation Beamforming/Full-Dimension (FD) MIMO for LTE (Release 13)," 3GPP TR 36.897 V13.0.0 (Jun. 2015), 58 pages.

PCT International Preliminary Report on Patentability in International Appln. No. PCT/US2016/038971, dated May 8, 2018, 7 pages.

* cited by examiner

1600

ANTENNA PORT MULTIPLEXING

CROSS REFERENCE TO RELATED APPLICATIONS

The present application is a national phase entry under 35 U.S.C. § 371 of International Application No. PCT/US2016/038971, filed Jun. 23, 2016, entitled "ANTENNA PORT MULTIPLEXING", which claims priority to U.S. Provisional Patent Application No. 62/250,322, filed Nov. 3, 2015, entitled "Antenna port multiplexing for NZP CSI-RS with more than 8 antenna ports," the entire disclosures of which are hereby incorporated by reference.

BACKGROUND

There is an ever increasing demand for network capacity as the number of wireless devices increases. With that increasing demand for capacity and increasing user equipment (UE) numbers comes a greater need for spectrum management, in terms of, for example, spectral efficiency and mitigating interference. Various techniques exist for increasing the traffic carrying capacity of a channel or cell. Those techniques comprise assigning subcarriers to specific user equipment, using multiple access techniques such as Orthogonal Frequency Division Multiple Access (OFDMA) and Single Carrier Frequency Division Multiple Access (SC-TDMA) in, for example, Long Term Evolution (LTE) and Long Term Evolution Advanced (LTE-A).

Other techniques also exist such as, for example, beamforming in which radio energy is transmitted in directional manner. A number of antennas can be arranged to produce a resulting beam pattern comprising lobes and nulls that can improve signal to noise ratios and signal to noise plus interference ratios. Beamforming supports multi-user communications and, in particular, the antennas can be used to support multiple-input multiple output (MIMO) communications such as, for example, multi-user MIMO (MU-MIMO).

3GPP Technical Standard TS 36.211 v13.0.0 (2015-12) (TS 36.211), clause 6.3, describes the general structure for downlink physical channels. Clause 6.3.5, in particular, describes resource element mapping for each antenna port used for transmitting a physical channel, subject to a number of conditions. One such condition is that given resource elements are assumed by a user equipment not to be used for certain cell-specific reference signal positions with associated antenna ports and frequency shifts of the cell-specific reference signals. 3GPP Technical Standard TS 36.211 v13.0.0 (2015-12), clause 6.4, further defines the Physical Downlink Shared Channel (PDSCH) via a number of additions and exceptions. One such exception describes resource elements not to be used by the PDSCH, which include resource elements assumed by the UE to be used for transmitting non-zero power (NZP) Channel State Information (CSI) reference signals (CSI-RS) for CSI reporting, where the positions of the non-zero power CSI reference signals for CSI (NZP CSI-RS) reporting are given by clause 6.10.5.2 of TS 36.211 and the configuration for non-zero power CSI reference signals is determined according to clause 6.10.5.2 of TS 36.211. CSI-RSs are used by a UE to estimate channel condition and to report Channel Quality Information (CQI) to an eNodeB (eNB). The channel condition can comprise, for example, a transfer function of a channel or a characteristic thereof.

In an effort to improve performance, Elevation Beamforming/Full Dimension (FD) Multiple Input, Multiple Output (MIMO) is being considered for Long Term Evolution Advanced Pro for Release 13 et seq.

The reference signals are used as a basis for performing channel measurements and feedback. A downlink (DL) transmission bearing a reference signal can be used by a UE to perform such channel estimation. Examples of such reference signals can comprise Common or Cell Specific Reference Signals (CRS) as per Rel 8/9, Demodulation Reference Signals (DM-RS) as per Rel 10, which DM-RS signals are used for channel estimation during PDSCH demodulation. In Rel 10, Channel State Information Reference Signals (CSI-RS) support channel status measurements for multiple antenna situations. The CSI-RS in Rel 10 can support up to 8 transmission antennas and the number of CSI-RS antenna ports can be 1, 2, 4 or 8.

BRIEF DESCRIPTION OF THE DRAWINGS

Aspects, features and advantages of embodiments will become apparent from the following description given in reference to the appended drawings in which like numerals denote like elements and in which.

DETAILED DESCRIPTION

Figure 1:
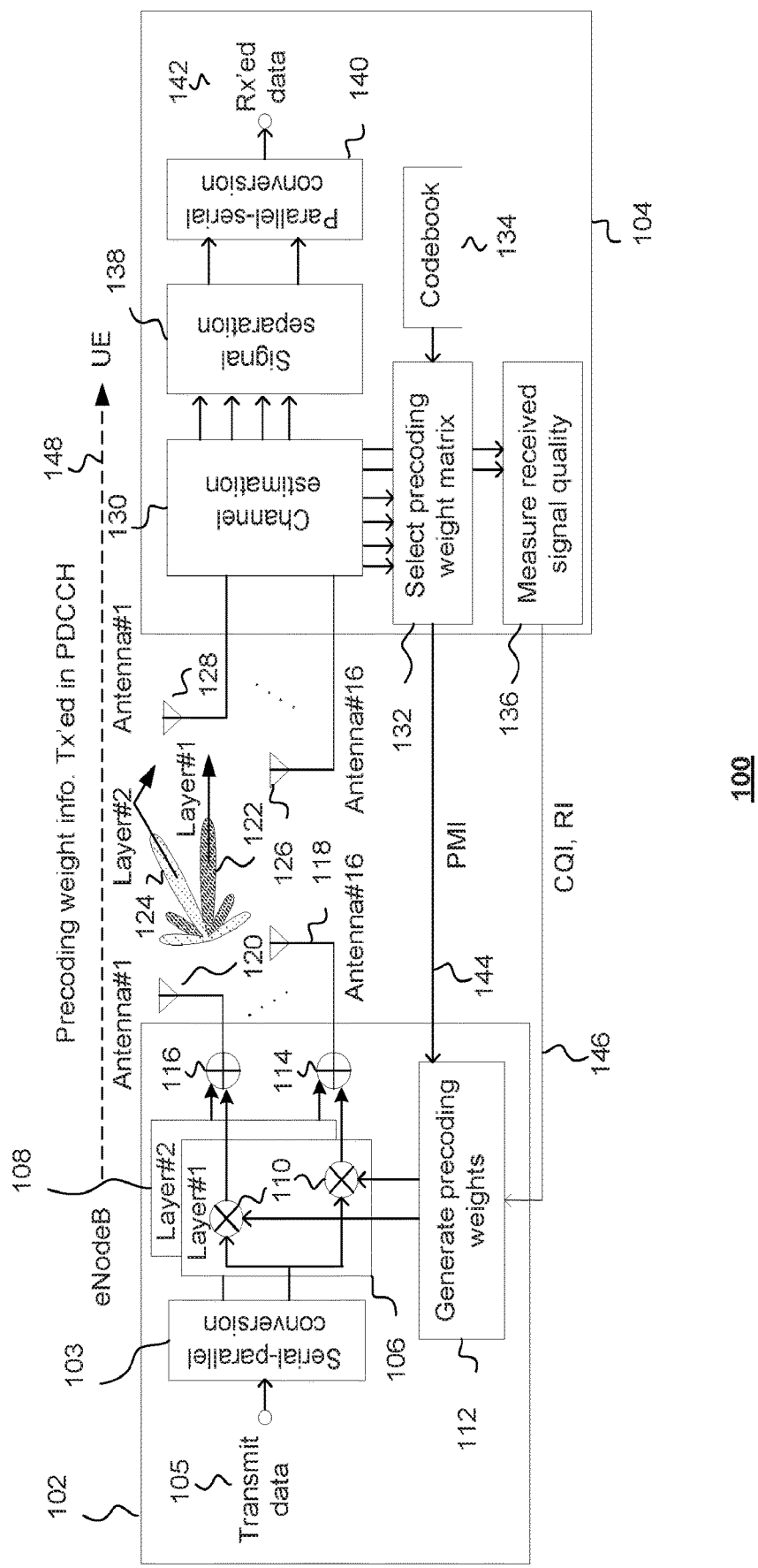
FIG. 1 illustrates an eNB and UE according to embodiments.

FIG. 1 shows a view of a communication system 100 comprising an eNodeB (eNB) 102 and a user equipment (UE) 104. The eNB 102 and the user equipment 104 can be configured to communicate using beam forming. In the example depicted, the eNB 102 is arranged to output at least one beam formed transmission, that is, the eNB directs radio energy in a shaped manner to the user equipment 104. The radio energy is arranged to form an antenna pattern.

The eNB 102 can comprise a serial to parallel converter 103 to convert transmit data 105 to at least one layer for transmission. In the illustrated embodiment, two layers 106 and 108 are shown, that is, layer #1 106 and layer #2 108. Example implementations can be realized that use a set of layers such as, for example, 1 to 8 layers. The layers 106 and 108 can be formed by mixing, using respective mixers 110, precoding weights, supplied by a precoding weights generator 112. The outputs of the layers 106 and 108 can be supplied to respective adders 114 and 116. The outputs from the adders 114 and 116 are transmitted to the user equipment 104 via one or more than one antenna of the eNB 102;

namely, a set of antennas 118 to 120. In the embodiment described, 16 such antennas 118 to 120 are used; two of which are depicted. Example implementations can use a number of antennas such as, for example, 1, 2, 4, 8, 12, 16, 20, 24 or some other number of antennas. The precoding weights result in one or more than one formed beam. In the example shown, two antenna beam patterns 122 and 124 are shown. The two antenna beam patterns can be directed to one or more than one UE.

The UE 104 can comprise one or more than one antenna. In the illustrated embodiment, a plurality of antennas is provided. More particularly, four antennas are provided; two 126 and 128 of which are shown. Example implementations can use a set of antennas such as, for example, 1, 2, 4, 8, 12, 16, 20, 24 or some other number of antennas. The antennas 126 and 128 receive one or more of the transmit beams 122 and 124.

A channel estimator 130 is configured to process signals received by the antennas 126 and 128. The channel estimator 130 can produce channel data associated with an estimate of one or more than one channel between the eNB 102 and the user equipment 104. The channel data is output to a precoding weight matrix selector 132. The precoding weight matrix selector 132 is responsive to a codebook 134 to provide a Precoding Matrix indicator (PMI) to the eNB 102, in particular, to provide the PMI to the precoding weights generator 112. The channel estimator 130 forwards the received signals to a signal separator 138. The signal separator 138 separates the received signals into respective parallel data streams. The parallel data streams are processed by a parallel to serial converter 140 to output received data 142. The channel data from the channel estimator 130 can also provide an output to processing circuitry 136 configured to provide data associated one or more than one characteristic of one or more wireless channels or associated with received signal quality. The data can be provided in a closed-loop feedback manner to the eNB 102 for comparison with the transmitted data. In the embodiment illustrated, the data can comprise Channel State Information (CSI) comprising at least one of a Channel Quality Indicator (CQI) or a Rank Indicator (RI) 146. Example implementations can provide both the CQI and the RI 146 to the eNB 102. The eNB 102 uses at least one of the CQI, RI 146 or PMI 144, taken jointly and severally in any and all permutations, to control adaptively the transmissions such as, for example, the number of layers transmitted, to the user equipment 104 or transmitted to a plurality of UEs. Such channel estimations can be based on the above CSI-RS signals In the example shown, the eNB 102 and the UE 104 are configured to communicate using 4×4 MIMO with a Rank 2, that is, both layers are destined for the user equipment 104. Alternatively, or additionally, the antennas and layers can be configured to serve a number of UEs. Insofar as concerns the data path, the precoding weights selected by the precoding weights generator 112 are communicated to the user equipment 104 via a communication channel such as, for example, the Physical Downlink Control Channel (PDCCH) 148 of LTE-A.

Channel State Information Reference Signals (CSI-RS) were introduced in LTE-A for release 10 (Rel-10) to support channel measurement for CSI calculation. CSI-RS supports 2, 4 or 8 antenna ports. The density of CSI-RS can be 1 resource element per physical resource block (PRB) pair per CSI-RS antenna port. A CSI-RS can be located in every Physical Resource Block (PRB) pair and periodically transmitted. A periodicity of CSI-RS transmissions can be 5 subframes. CSI-RSs for different number of antenna ports can have a nested structure, i.e. CSI-RS resources corresponding to a lower number of antenna ports is a subset of CSI-RS resources of a CSI-RS pattern corresponding to a higher number of CSI-RS antenna ports. The parameters of CSI-RS are conveyed to the user equipment (UE) using higher layer signaling, such as, for example, L3 or above.

Suitably, the resource elements such as, for example, CSI-RS bearing resource elements, also known as CSI-RS resource or CSI-RS resources, are conveyed according to respective CSI-RS configuration data or parameters sets. The CSI-RS configuration data or parameters sets can prescribe one or more of CSI-RS antenna ports, CSI-RS resource index, CSI-RS periodicity, subframe structure or offset or a relative transmit power for a respective CSI-RS taken jointly and severally in any and all permutations. Embodiments can be realized in which the configuration data further comprises at least one or more than one of layers, codes or scrambling identities associated with a UE.

3GPP TR 36.897 v13.0.0 (2015-06), which was a Study on elevation beamforming/Full-Dimension (FD) Multiple Input Multiple Output (MIMO), advocated a non-precoded CSI-RS approach of supporting FD-MIMO in which CSI-RS signals are transmitted from antenna elements of an eNB without precoding to facilitate channel estimation at the UE for each eNB antenna. The UE, based on such channel information, calculates and reports Channel State Information (CSI) for each eNB antenna. However, Non-zero power (NZP) CSI-RS with orthogonal cover code (OCC-2) based antenna port multiplexing would not allow full-power transmission for a NZP CSI-RS resource with 12 or more antenna ports without increasing the maximum value of 6 dB for power boosting considered by RAN4 as an upper bound.

The Channel State Information (CR) can be reported in a prescribed format or form. Such a prescribed format or form can comprise a set of recommendations to the eNB regarding transmissions properties such as, for example, MIMO transmission properties. Embodiments can be realized in which the CSI can comprise at least one or more than one of Channel Quality Indicator (CQI), precoding matrix indicator (PMI), precoding type indicator (PTI) or Rank Indication (RI) taken jointly and severally in any and all permutations. RI provides an indication of the number of layers that the UE recommends for eNB transmissions. PMI is an index to a UE recommended precoding matrix. The time and frequency resources assigned to the UE for reporting CSI are prescribed by the eNB, in the form of CSI-RS resource configuration data. A UE is configurable by higher layers, as prescribed in, for example, TS 36.331 v13.0.0 (2015-12), semi-statically or semi-persistently to periodically provide one or more than one CSI component, that is, one or more than one of CQI, PMI, PTI or RI taken jointly and severally in any and all permutations.

In general, spatial processing occurs at a transmitter. In (single-layer) beam forming, the same signal is emitted from each of the transmit antennas with at least one of appropriate phase or gain weighting such that the signal power is maximized at a receiver input. The benefits of beamforming can be to increase the received signal gain, by making signals emitted from different antennas add constructively, and to reduce multipath fading effects. When a receiver has multiple antennas, the transmit beam forming cannot simultaneously maximize the signal level at all of the receive antennas, and precoding with multiple streams is used. Precoding can generally use knowledge of channel state information (CSI) at the transmitter as indicated above.

In various embodiments, the UE 104 and/or the eNB 102 may include such a set of antennas 118 to 120 and 126 to 128 to implement a multiple-input-multiple-output (MIMO) transmission system, which may operate in a variety of MIMO modes, including a single-user MIMO (SU-MIMO) mode, a multi-user MEMO (MU-MIMO) mode, a closed loop MIMO mode, an open loop MIMO mode or a mode associated with variations of smart antenna processing. The UE 104 may provide some type of channel state information (CSI) feedback to the eNB 102 via one or more up link channels, and the eNB 102 may adjust one or more down link channels based on the received CSI feedback. The feedback accuracy of the CSI may affect the performance of the MIMO system.

Figure 2:
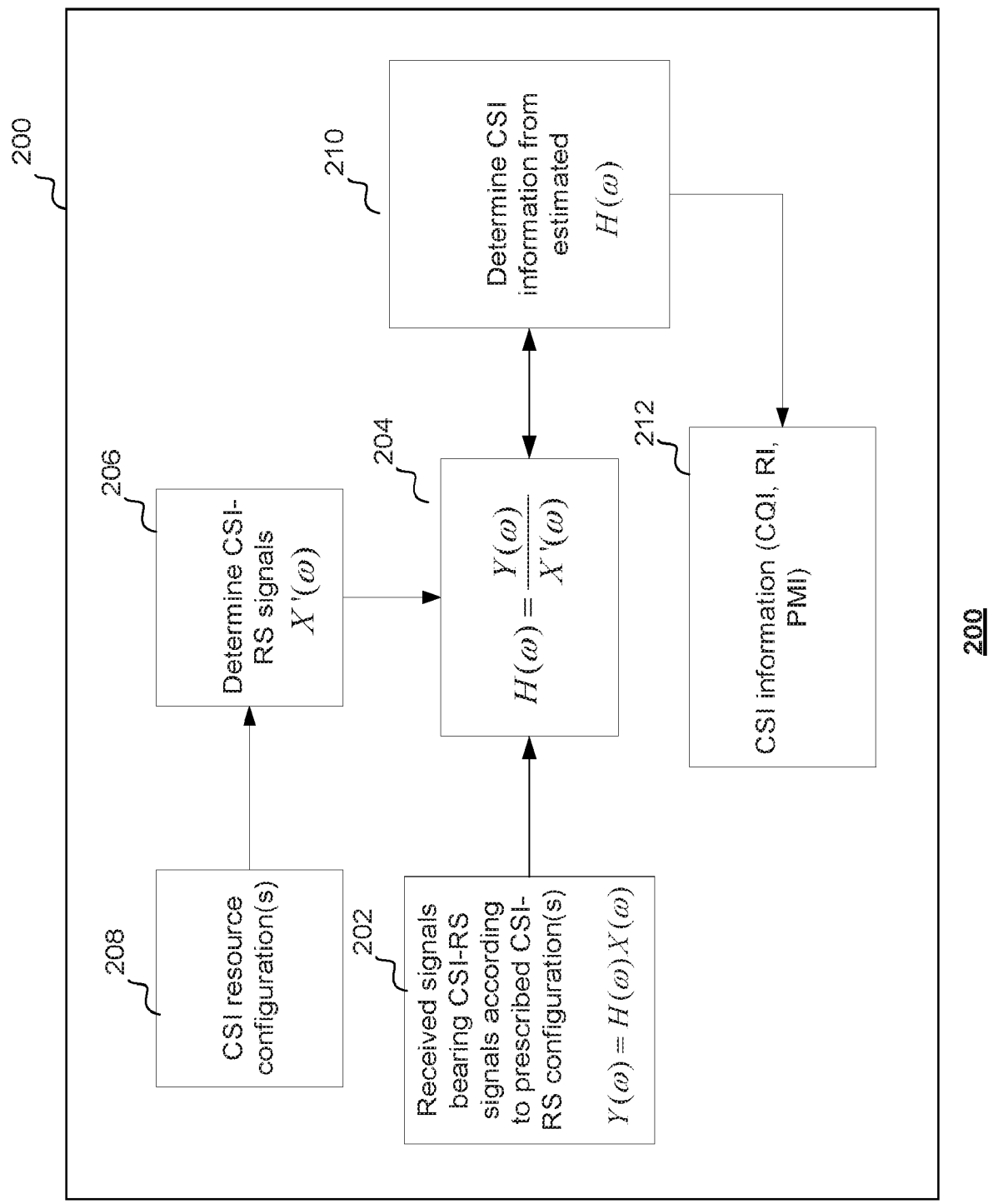
FIG. 2 shows an apparatus according to an embodiment.

As indicated above, in various embodiments, the UE 104 may transmit CSI feedback to the eNB 102 when that information is available. The CR feedback may include information related to channel quality index (CQI), precoding matrix indicator (PMI), and rank indication (RI). PMI may reference, or otherwise uniquely identify, a precoder within the codebook. The eNB 102 may adjust the downlink channels based on the precoder referenced by the PMI. The CSI feedback is responsive to a prescribed format. FIG. 2 depicts an apparatus 200, such as, the UE 104 or a component for such a UE, for processing received CSI-RS signals configured according to CSI-RS resource configuration(s). In general, the received signals can be represented in the frequency domain as $$Y(\omega)=H(\omega)X(\omega),$$

where $Y(\omega)$ represents the received CSI-RS signals or signals bearing one or more CSI-RSs received by a UE, which were initially configured and transmitted according to associated CSI-RS resource configurations,
$H(\omega)$ represents the channel over which the received signals have propagated, that is, the channel transfer function, and $X(\omega)$ represents the originally transmitted CSI-RS signals.

It can be appreciated that received signals 202 are received and forwarded to channel estimation circuitry or logic 204. The channel estimation circuitry or logic 204 also receives an ideal version of CSI-RS signals 206, $X'(\omega)$, generated according to the CSI-RS resource configurations by CSI-RS generator circuitry or logic 208. The CSI-RS resources configurations provide the UE with data allowing signals associated with $X(\omega)$ to be generated at the UE.

The channel estimation logic 204 processes the received signals, $Y(\omega)$, and the generated signals, $X'(\omega)$, to determine the channel transfer function, $H(\omega)$, as follows: $H(\omega)=Y(\omega)/X'(\omega)$. The estimated channel transfer function, $H(\omega)$, is used by CSI information estimation circuitry or logic 210 to determine Channel State Information 212B. It will be appreciated that the channel estimation logic 204 can be an embodiment of the above channel estimator 130.

Figure 3:
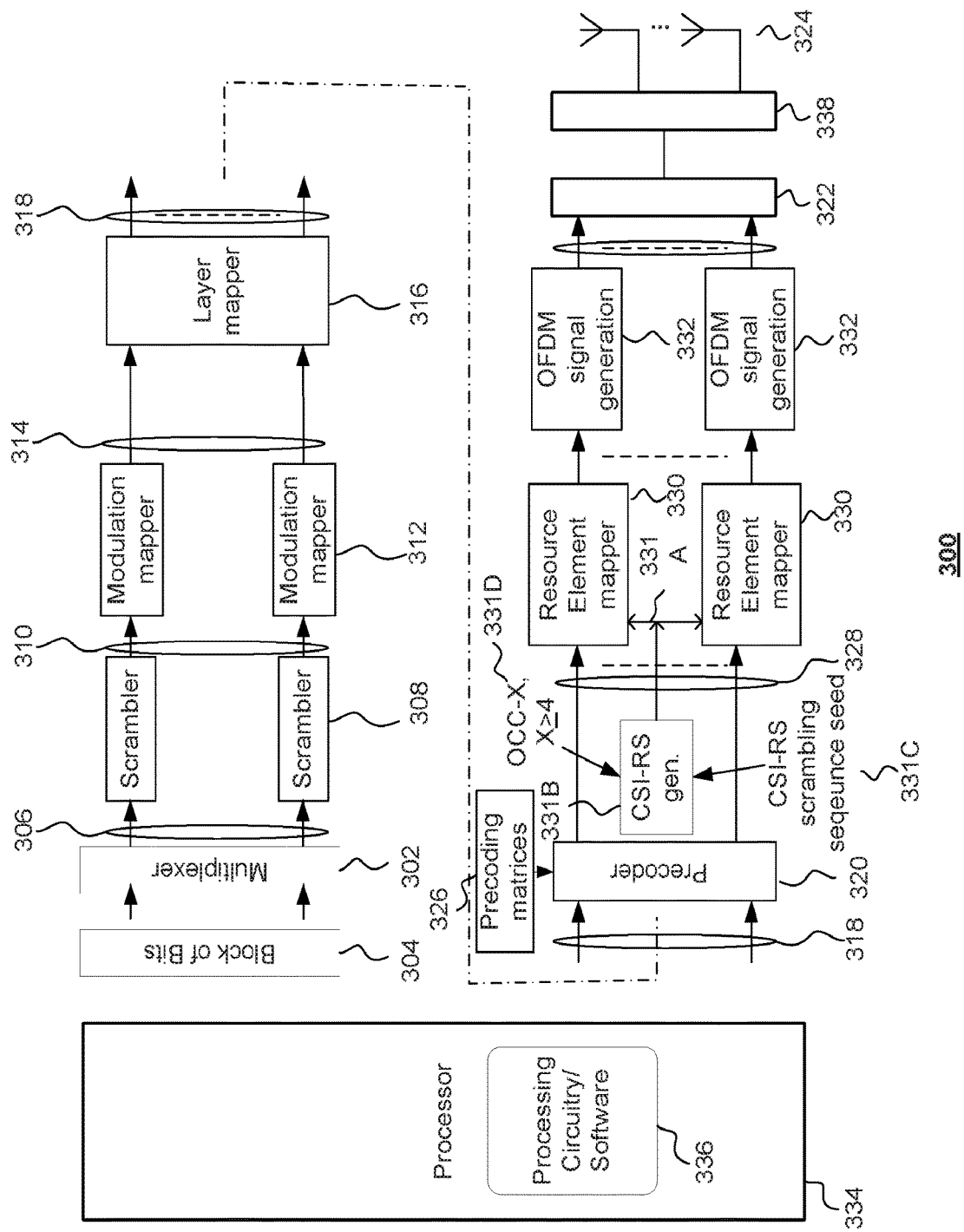
FIG. 3 depicts an eNB or component thereof.

FIG. 3 depicts a system or apparatus 300, such as, an eNB 102 or such a system or apparatus for such an eNB 102, for realizing embodiments. The system 300 of FIG. 3 depicts an architecture that can apply to one or more than one other channel as well as, or as an alternative to, the PDCCH. The one or more than one other channel can be, for example, another control channel or some other type of channel such as, for example, a Physical Broadcast Channel (PBCH), PDSCH, Physical Control Format Indicator Channel (PCFICH), PDCCH, Physical Hybrid-ARQ Indicator Channel (PHICH), Physical Uplink Control Channel (PUCCH), Physical Uplink Shared Channel (PUSCH) and Physical Random Access Channel (PRACH); the latter three channels being uplinks in contrast to the former downlinks.

Baseband signals representing uplink and/or downlink physical channels can be defined using the following operations and associated entities. The system 300 may include a multiplexer 302 for multiplexing a block of bits 304. The multiplexer 302 outputs multiplexed bits 306 associated with the block of bits 304.

One or more than one scrambler 308 scrambles the multiplexed block of bits 306 to be transmitted in a transmission (e.g., over a physical channel). The scrambler 308 is configured, therefore, to produce scrambled bits 310. The scrambler 308 is responsive to a scrambling code seed to generate a data scrambling sequence.

Using information about the channel, the transmitter may tailor the transmit signal output to the channel in a manner that simplifies or improves receiver processing. The receiver may generate channel-related feedback information by processing training signals received from the transmitter such as the CSI-RS signals.

One or more than one modulation mapper 312 modulates the scrambled bits 310 to generate modulation symbols 314 for output. These generated modulation symbols 314 can be complex-valued modulation symbols.

The one or more than one modulation mapper 312 can selectively use at least one of a binary phase shift keying (BPSK) constellation, a quadrature phase shift keying (QPSK) constellation or a quadrature amplitude (QAM) constellation such as, for example, 8-QAM, 16-QAM 64-QAM, 256QAM. The type of modulation used may depend on the signal quality or channel conditions. The modulation mapper 312 is not limited to using such modulation constellations. The modulation mapper 312 can, alternatively or additionally, use some other form of modulation constellation.

A layer mapper 316 is configured to map the complex-valued modulation symbols 314 onto one or more than one transmission layer of, or to produce, layered modulation symbols 318.

A precoder 320 is configured to precode the layered modulation symbols 318 for transmission or output. The precoder 320 may encode the complex-valued modulation symbols 318 on each layer for transmission onto one or more than one antenna port 322. Precoding may be used to convert antenna domain signal processing into beam-domain processing. Additionally, the one or more than one antenna port 322 may also be coupled to one or more than one antenna such as, for example, the plurality of antennas 324 shown or can be one or more than one virtual antenna port. The antennas 118 to 120 are embodiments of such as plurality of antennas. The precoding performed by the precoder 320 may be chosen from a finite set of precoding matrices 326, called a codebook, which is known to both a receiver and a transmitter. The precoder 320 is configured to output coded symbols 328. One or more than one resource element mapper 330 maps the coded symbols 328 output by the precoder 330 to respective resource elements. The one or more than one resource element mapper 330 can map at least one of actual data symbols, one or more than one reference signal, one or more than one positioning signal, one or more than one synchronization signal or one or more than one control information symbol, taken jointly and severally in any and all permutations, into predetermined or selected respective resource elements in a resource grid. Such a reference signal can comprise a CSI-RS.

The resource element mapper 330 is also responsive to or receives a CSI-RS 331A output by a CSI-RS generator 331B. The CSI-RS generator 331B is responsive to one or more than one seed parameter that influences the CSI-RS generating process or operation. Embodiments can be realized in which the one or more than one seed parameter comprises at least one of a scrambling identity 331C or a CSI-RS scrambling sequence seed 331D in accordance with, for example, 3GPP TS 36.211 v12.7.0 (2015-09), section 5.5, or earlier technical standard (TS), and 3GPP TS 36.212, v12.6.0 or earlier TS. As appropriate, embodiments can provide an indication regarding whether or not a higher layer parameter Active-CSI-RS—with orthogonal cover code signal (OCC) is set, which will influence the OCC used to transmit the CSI-RS signal. The terms "orthogonal cover code" and "orthogonal cover sequence" are used synonymously. Therefore, the CSI-RS generator can also be responsive to an OCC enable/disable signal 331D. The OCC enable/disable signal influences or controls whether or not an OCC is used in generating or representing the CSI-RS 331A, which is described later in this specification. Embodiments use an OCC of a prescribed length. Embodiments can be realized in which the OCC has a length of 4. Alternatively, or additionally, embodiments can be realized in which the OCC has a length of 8.

The CSI-RS resources support UE channel estimation. The number of CSI-RS resources can vary with the number of antennas or antenna ports. For each channel to be estimated, one of a number of CSI-RS configurations is configured by UE higher layers, such as, for example, L3 or above, in response to respective higher layer signalling.

One or more than one OFDM signal generator 332 is configured to generate a complex-valued time-division duplex (TDD) and/or frequency division duplex (FDD) OFDM signal for the one or more than one antenna port 322 for transmission via the one or more than one antenna 324 after processing, such as up-conversion, by an RE front end 338, to a selectable frequency band. The one or more than one antenna 334 can comprise antennas such as the above antennas 118, 120, 126 and 128.

Also shown in FIG. 3, is a processor 334. The processor 334 comprises processing circuitry 336 to coordinate the operation of the system 300 and, in particular, to the control operation of the resource element mapper 330. The processing circuitry 336 can be realized using hardware or software or a combination of hardware and software. It will be appreciated that such processing circuitry can be an embodiment of logic. The software could be stored using a non-transitory or other non-volatile storage such as, for example, a read-only memory or the like.

Although FIG. 3 has been described with reference to an eNB, embodiments are not limited thereto. Embodiments can additionally or alternatively be realized in the form of some other type of transmit or access point, or as a component, apparatus or system for such an eNB or other type of transmit or access point.

Figure 4:
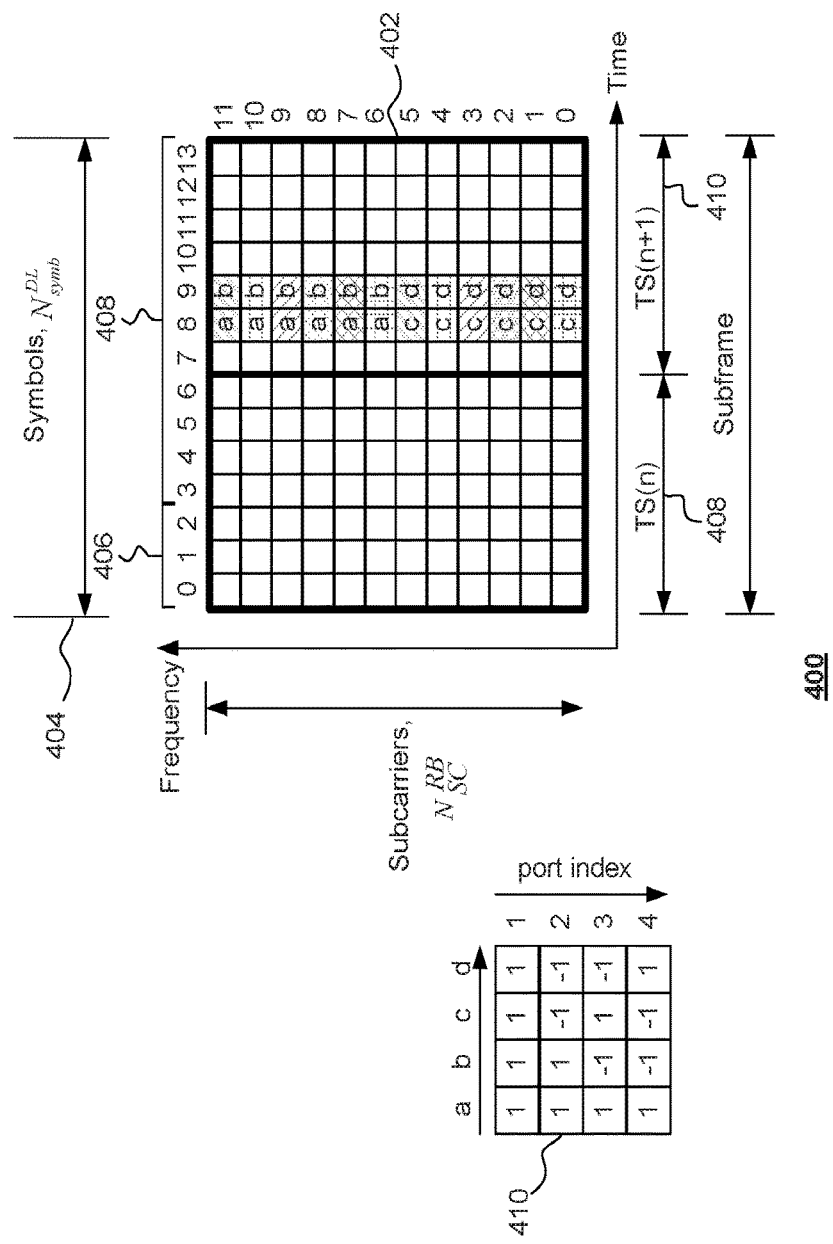
FIG. 4 depicts radio resources according to an embodiment.

FIG. 4 schematically illustrates a view 400 of CSI-RS resources of a part of a subframe such as, for example, a downlink LTE subframe or other subframe, showing, at least in part, the structure of CSI-RS resources, also known as a CSI-RS resource pattern, transmitted or capable of being transmitted by the eNB 102. The transmitted signals could represent, for example, at least one or more than one of a Physical Downlink Control Channel (PDCCH) and a Physical Downlink Shared Channel (PDSCH).

An illustrative resource block 402 of a total of $N_{RB}$ resource blocks of the subframe 400 is shown. The subframe 400 can comprise a number, $N_{symb}^{DL}$, of OFDM symbols 404 along the time axis and $N_{RB} \cdot N_{SC}^{RB}$ subcarriers along the frequency axis of which $N_{SC}^{RB}$ subcarriers are shown, more particularly, 12 subcarriers in the illustrated example. In the illustrated embodiment, it is assumed that normal cyclic prefixes are used such that there are fourteen symbols per subframe. Embodiment can be realized in which extended cyclic prefixes are used.

It can be appreciated that embodiments provide for the CSI-RS signals to be carried by one or more than one respective resource element, otherwise known as CSI-RS resources. In the illustrated embodiment, the CSI-RS resources comprise a predetermined set of resource elements. The predetermined set of resource elements can comprise at least one or more ODFM symbols, such as symbols 8 and 9. Embodiments are provided in which the OFDM symbols are adjacent to one another. The predetermined set of resource elements can comprise prescribed subcarriers. The prescribed subcarriers can be either adjacent subcarriers or non-adjacent subcarriers.

The subframe 400 can comprise a set of L OFDM symbols (L=1, 2, 3) at the beginning of each subframe in a PDCCH region 406 spanning a predetermined number of OFDM symbols; a set, or width, of three OFDM symbols in this example arrangement. In other embodiments, the subframe or PDCCH transmission can use a different pattern or a different number of OFDM symbols. There is shown a PDSCH region 408 for carrying downlink data, which spans the remaining OFDM symbols of the subframe. It will be appreciated that embodiments can be realized in which some other number of OFDM symbols are used per time slot such as, for example, 6 OFDM symbols in the case of an extended cyclic prefix.

Embodiments are provided in which additional CSI-RS ports can be provided and used for higher order MIMO with a larger number of UEs, such as more than 2 UEs, and/or a larger number of layers can be assigned per UE such as 2, 3, 4, 8, 12, 16, 32, 64 or more layers. Example implementations support higher order MU-MIMO using orthogonal and non-orthogonal CSI-RS multiplexing.

Still referring to FIG. 4, there is shown an orthogonal cover code 410 of a prescribed length. In the illustrated embodiment, the prescribed length is 4, that is, it is an OCC-4. The OCC is indexed according to resource elements corresponding to respective antenna ports. The OCC 410 is also indexed according to an antenna port number. In the example illustrated, there are four antenna ports. Therefore, the embodiment illustrated is arranged to provide a 4 port CSI-RS configuration using code division multiplexing for antenna port multiplexing.

It can be appreciated that the resource elements are grouped into pairs and labelled a and b and c and d. There are provided two sets of pairs of resource elements, each distinguished by the background shading and labelled a or b and c or d.

A given value of a prescribed CSI-RS is multiplied by a respective OCC-4 code according to the antenna port index and the result is distributed across the prescribed resource elements. It will be appreciated that the distribution is an embodiment of processing such as, for example, spreading or multiplexing. Therefore, embodiment can be realized in which the CSI-RS is spread or multiplexed over the prescribed resource elements. Similarly, when recovering the CSI-RS, the CSI-RS will be similarly processed, that is, demultiplexed or despread from prescribed resource elements.

Embodiments can be realized in which there is an aggregation of a 4 antenna port CSI-RS configuration in which a predetermined OCC, such as, for example, the OCC-4 code, is used on resource elements of the same OFDM symbol, but on non-adjacent subcarriers. It can be seen that a first antenna port would use the first OCC-4 code. Each antenna port corresponds to a predetermined group of resource elements such as, for example, 2 or more resource elements. In the embodiment illustrated, each antenna port or CSI-RS is associated with 4 resource elements. Therefore, assuming resource elements of the ODFM symbols 8 and 9 and subcarriers 11 and 5 correspond to antenna port 1, a given bit of a CSI-RS signal would be multiplied by the respective OCC-4 values dictated by the a, b, c, d, indices and transmitted using the respective resource elements of OFDM symbols 8 and 9 and subcarriers 11 and 5. Subcarriers 11 and 5 are non-adjacent subcarriers. Similarly, a subsequent bit of the same CSI-RS signal would be distributed or otherwise spread over the aforementioned resource elements. Therefore, a given CSI-RS bit value would be multiplied by OCC-4 of 1,1,1,1 for the first antenna port.

Similarly, the same CSI-RS signal corresponding to a different antenna port would be multiplied by a respective OCC-4 value with the result being distributed over corresponding resource elements. For example, assuming that a second antenna port was associated with resource elements of prescribed OFDM symbols such as the $8^{th}$ and $9^{th}$ OFDM symbols, and associated with prescribed subcarriers, such as, for example, subcarriers 10 and 4, the same given CSI-RS bit as described above with respect to subcarriers 11 and 5, could be multiplexed onto resource elements associated with OFDM symbols 8 and 9 and corresponding subcarriers 10 and 4. Subcarriers 10 and 4 are non-adjacent subcarriers. Therefore, in the case of the aggregation of a 4 antenna port CSI-RS configuration, the OCC-4 code is used to distribute the CSI-RS on resource elements of the same ODFM symbols, but using non-adjacent subcarriers. Such antenna port multiplexing can used within a context of small channel delay spread.

Embodiments herein can at least mitigate or surmount the issue associated with non-zero power CSI-RS with orthogonal cover code (OCC-2) based antenna multiplexing of not allowing full power transmission for NZP CSI-RS resource with up to a predetermined number of antenna ports such as, for example, 12 and 16 or more antenna ports without increasing a predetermined maximum power boosting such as, for example, 6 dB. Embodiments described herein can support or allow full power transmission of NZP CSI-RS resource without exceeding the maximum of 6 dB power boosting.

It can be appreciated that spreading the energy associated with a CSI-RS across multiple resource elements associated with respective antenna ports supports CSI-RS aggregation at a UE subject to higher layer UE configuration.

Embodiments can provide for aggregating NZP CSI-RS resources with 12, 16 or more antenna ports using multiple CSI-RS resource configurations with 4 or 8 antenna ports. For each configured CSI-RS resource configuration, an OCC-4 code spreading is applied in time and frequency for antenna port multiplexing within the antenna ports of the CSI-RS resource. It can be appreciated that OCC-based antenna port multiplexing is used within each CSI-RS resource configuration constituting NZP CSI-RS resource. The UE, in response to higher layer configuration regarding the use or anticipated use of OCC-4 antenna port multiplexing, can assume that for each configured CSI-RS resource configuration the antenna port multiplexing is performed according to OCC-4 as opposed to, for example, OCC-2 based antenna port multiplexing.

Although the above embodiments have been described with reference to OCC-4 based antenna port multiplexing of CSI-RS signals, embodiments are not limited thereto. Embodiments can be extended to other OCC lengths such as, for example, OCC-8, which has a code length of 8. Using OCC-8, the aggregation of NZP CSI-RS resource can be performed using CSI-RS configuration with at least 8 antenna ports.

Furthermore, although the above embodiments have been described with reference to 12 or 16 antenna ports, embodiments are not limited to 12 or 16 antenna ports. Embodiments can be realized in which some other number of antenna ports can be used. For example, aggregating CSI-RS(s) carried with three groups of resources associated with OCC-4 would support CSI-RS configuration with 12 antenna ports. Alternatively, aggregating CSI-RS signals multiplexed using OCC-8 using two groups of resources would support a CSI-RS configuration with 16 antenna ports.

A first CSI-RS signal associated with a first CSI-RS resource configuration multiplexed using a respective OCC having a length of 4 or more over a respective number of antenna ports can be aggregated with the same CSI-RS signal associated with a second CSI-RS resource configuration multiplexed using the respective OCC having a length of 4 or more over the respective number of antenna ports. For example, using an OCC-4 code for spreading a CSI-RS over 4 antenna ports in time and frequency can result in a full power transmission or near full power transmission. The OCC-4 based antenna port multiplexing is used with each CSI-RS resource configuration constituting a NZP CSI-RS resource with 12, 16 or more than 16 antenna ports.

Referring still to FIG. 4, it can be appreciated that there is shown a 4 CSI-RS resource configuration, that is, 4 resource elements constitute a CSI-RS configuration. A resource configuration is denoted or otherwise defined by a group or set of related resource elements. Taking, for example, the OFDM symbols 8 and 9, it can be appreciated that the resource elements defined by the subcarriers 11 and 5 constitute a CSI-RS resource configuration. A CSI-RS resource configuration is used to carry a respective CSI-RS signal, whose data units, such as bits or modulation symbols, have been spread using a respective OCC of length 4 or more over the related resource elements. Therefore, it can be appreciated that the resource block 402 of FIG. 4 comprises a number of possible CSI-RS resource configurations. In the illustrated example, six possible CSI-RS resource configurations are depicted. Suitably, a second CSI-RS resource configuration comprises the resource elements associated with OFDM symbols 8 and 9 on subcarriers 10 and 4. A third CSI-RS resource configuration comprises the resource elements associated with OFDM symbols 8 and 9 on subcarriers 9 and 3. A fourth CSI-RS resource configuration comprises the resource elements associated with OFDM symbols 8 and 9 on subcarriers 8 and 2. A fifth CSI-RS resource configuration comprises the resource elements associated with OFDM symbols 8 and 9 on subcarriers 7 and 1. A sixth CSI-RS resource configuration comprises the resource elements associated with OFDM symbols 8 and 9 on subcarriers 6 and 0. Although the above embodiments refer to ODFM symbols 8 and 9, alternative OFDM symbols can be used. The foregoing embodiments constitute a 4 port CSI-RS configuration.

It can be appreciated that code division multiplexing is used to multiplex the antenna ports using a 4 port CSI-RS resource configuration.

Figure 5:
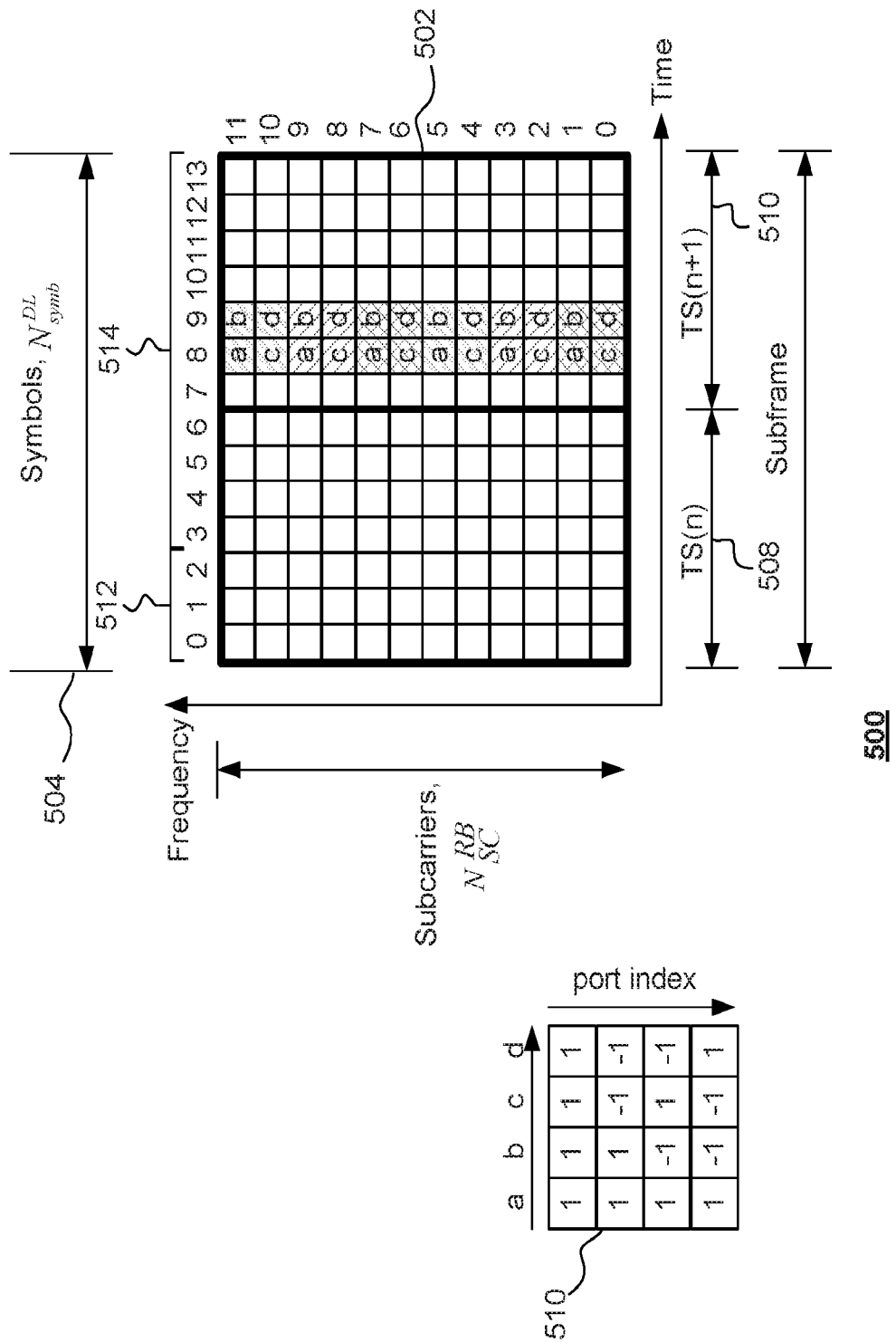
FIG. 5 depicts radio resources according to an embodiment.

Referring to FIG. 5, there is shown a view of a further antenna port CSI-RS configuration. A prescribed number of antenna ports, such as 8 in the illustrated example, is used to carry CSI-RS signals. FIG. 5 is an embodiment of an 8 port CSI-RS configuration. FIG. 5 schematically illustrates a view 500 of CSI-RS resources of a part of a subframe such as, for example, a downlink LTE subframe or other subframe, showing, at least in part, the structure of CSI-RS resource, also known as a CSI-RS resource pattern, transmitted or capable of being transmitted by the eNB 102. The transmitted signals could represent, for example, at least one or more than one of a Physical Downlink Control Channel (PDCCH) or a Physical Downlink Shared Channel (PDSCH).

An illustrative resource block 502 of a total of $N_{RB}$ resource blocks of the subframe 500 is shown. The subframe 500 comprises a number, $N_{symb}^{DL}$, of OFDM symbols 504 along the time axis and $N_{RB} \cdot N_{SC}^{RB}$ subcarriers along the frequency axis of which $N_{SC}^{RB}$ subcarriers are shown, more particularly, 12 subcarriers in the illustrated example. In the illustrated embodiment, it is assumed that normal cyclic prefixes are used such that there are fourteen symbols per subframe. Embodiment can be realized in which extended cyclic prefixes are used.

It can be appreciated that embodiments provide for the CSI-RS signals to be carried by respective resource elements, otherwise known as CSI-RS resources. In the illustrated embodiment, the CSI-RS resources comprise a predetermined set of resource elements. The predetermined set of resource elements can comprise at least one or more of ODFM symbols, such as symbols, for example, 8 and 9. Embodiments are provided in which the OFDM symbols are adjacent to one another. The predetermined set of resource elements can comprise prescribed subcarriers. The prescribed subcarriers can be either adjacent subcarriers or non-adjacent subcarriers.

The subframe 500 can comprise a set of L OFDM symbols (L=1, 2, 3) at the beginning of each subframe in a PDCCH region 506 spanning a predetermined number of OFDM symbols; a set, or width, of three OFDM symbols in this example arrangement. In other embodiments, the subframe or PDCCH transmission can use a different pattern or a different number of OFDM symbols. There is shown a PDSCH region 508 for carrying downlink data, which spans the remaining OFDM symbols of the subframe. It will be appreciated that embodiments can be realized in which some other number of OFDM symbols are used per time slot such as, for example, 6 OFDM symbols in the case of an extended cyclic prefix.

Embodiments are provided in which additional CSI-RS ports can be provided and used for higher order MIMO with a larger number of UEs, such as more than 2 UEs, and/or a larger number of layers can be assigned per UE such as 2, 3, 4, 8, 12, 16, 32, 64 or more layers. Example implementations can support higher order MU-MIMO using orthogonal and non-orthogonal CSI-RS multiplexing.

Still referring to FIG. 5, there is shown an orthogonal cover code 510 of a prescribed length. In the illustrated embodiment, the prescribed length is 4, that is, it is an OCC-4. The OCC is indexed according to resource elements corresponding to respective antenna ports. The OCC 510 is also index according to an antenna port number. In the example illustrated, there are four antenna ports. Therefore, the embodiment illustrated is arranged to provide an 8 port CSI-RS configuration using code division multiplexing for 4 antenna ports and frequency division multiplexing between antenna port quadruplets.

It can be appreciated that the resource elements are grouped into quadruplets and labelled a, b, c and d. There are provided two sets of quadruplet resource elements, each distinguished and grouped by the background shading and labelled a, b, c and d. A given value or symbol of a prescribed CSI-RS signal is multiplied by a respective OCC having a prescribed code length according to the antenna port index and the result is distributed across the prescribed resource elements. In the embodiment illustrated the OCC is an OCC-4 code. Alternative embodiments using a longer length OCC can be realized. Embodiments can be realized in which there is an aggregation of a 4 antenna port CSI-RS configuration in which a predetermined OCC, such as, for example, the OCC-4 code, is used on a quadruplet of resource elements of the same OFDM symbol as well as on a further quadruplet of resource elements on non-adjacent subcarriers. It can be seen that a first antenna port would use the first OCC-4 code. Each antenna port corresponds to a predetermined group of resource elements such as, for example, a quadruplet or more of resource elements. In the embodiment illustrated, each antenna port or CSI-RS is associated with 8 resource elements arranged in two sets of quadruplets, with each set of quadruplets being carried by non-adjacent resource elements.

Therefore, assuming resource elements of the ODFM symbols 8 and 9 and subcarriers 11 and 10 correspond to antenna port 1, a given bit of a CSI-RS signal would be multiplied by the respective OCC-4 values dictated by the a, b, c, d, indices and transmitted using the respective resource elements of OFDM symbols 8 and 9 and subcarriers 11 and 10. Similarly, the same bit or symbol of the CSI-RS would be multiplexed by a second OCC-4 code over the resource elements of a corresponding quadruplet of resource elements of a pair or set of quadruplets.

In the illustrated embodiment, such a corresponding quadruplet of resource elements corresponds to the resource elements associated with OFDM symbols 8 and 9 and subcarriers 4 and 5. Similarly, a subsequent bit of the same CSI-RS signal would be distributed or otherwise spread over the aforementioned resource elements. Therefore, a given CSI-RS bit value would be multiplied by OCC-4 of 1,1,1,1 for the first antenna port with the result being carried by a first set of quadruplet resource elements.

Similarly, the same CSI-RS signal corresponding to the same or to a different antenna port would be multiplied by a respective OCC-4 value with the result being distributed over corresponding resource elements of the same or a second or associated quadruplet of resource elements. For example, assuming that the same or a second antenna port was associated with resource elements of prescribed OFDM symbols such as OFDM symbols 8 and 9, and associated with prescribed subcarriers, such as, for example, subcarriers 5 and 4, the same given CSI-RS bit as described above with respect to subcarriers 11 and 10, could be multiplexed onto resource elements associated with OFDM symbols 8 and 9 and corresponding subcarriers 5 and 4. Subcarriers 11, 10 and 5, 4 are non-adjacent sets of subcarriers.

Therefore, in the case of an 8 port CSI-RS configuration, the OCC-4 code is used to distribute the CSI-RS on resource elements of the same ODFM symbols, but using non-adjacent sets of subcarriers. In the illustrated embodiment, a set of subcarriers comprises a quadruplet of subcarriers. Alternative embodiments can be realized in which a set of subcarriers comprises some other number of subcarriers such as, for example, a number of subcarriers that is a power of two or a multiple of two such as, for example, 8, 16, 32, 64 etc., that is, $n^2$, where n is greater than or equal to 2, or 4, 6, 8, 10, 12, 14, 16, 18, 20 etc., that is 2n, where n is greater than or equal to 4.

Embodiments herein can at least mitigate or surmount the issue associated with non-zero power CSI-RS with orthogonal cover code (OCC-2) based antenna multiplexing of not allowing full power transmission for NZP CSI-RS resource with up to a predetermined number of antenna ports such as, for example, 12 and 16 or more antenna ports without increasing a predetermined maximum power boosting such as, for example, 6 dB. Embodiments can be realized that support or allow full power transmission of NZP CSI-RS resource without exceeding the maximum of 6 dB power boosting. Therefore, the CSI-RS distributed or otherwise multiplexed over the two or more sets of resource elements can be aggregated. The aggregation can be realized at a higher layer within a device such as, for example, at Layer 3 within an LTE device.

It can be appreciated that spreading the energy associated with a CSI-RS across multiple resource elements associated with respective antenna ports supports CSI-RS aggregation at a UE subject to higher layer UE configuration.

Embodiments can provide for aggregating NZP CSI-RS resources with 12 or 16 antenna ports using multiple CSI-RS resource configurations with 4 or 8 antenna ports. For each configured CSI-RS resource configuration, an OCC-4 code spreading is applied in time and frequency for antenna port multiplexing within the antenna ports of the CSI-RS resource. It can be appreciated that OCC-based antenna port multiplexing is used within each CSI-RS resource configuration constituting NZP CSI-RS resource. The UE, in response to higher layer configuration regarding the use or anticipated use of OCC-4 antenna port multiplexing, can assume that for each configured CSI-RS resource configuration the antenna port multiplexing is performed according to OCC-4 as opposed to, for example, OCC-2 based antenna port multiplexing.

Although the above embodiments have been described with reference to OCC-4 based antenna port multiplexing of CSI-RS signals, embodiments are not limited thereto. Embodiments can be extended to other OCC lengths such as, for example, OCC-8, which has a code length of 8. Using OCC-8, the aggregation of NZP CSI-RS resource can be performed using CSI-RS configuration with at least 8 antenna ports or a number of antenna ports that is a multiple of 8.

Furthermore, although the above embodiments have been described with reference to 12 or 16 antenna ports, embodiments are not limited to 12 or 16 antenna ports. Embodiments can be realized in which some other number of antenna ports can be used. For example, aggregating CSI-RS(s) carried with three groups of resources associated with OCC-4 would support CSI-RS configuration with 12 antenna ports. Alternatively, aggregating CSI-RS signals multiplexed using OCC-8 using two groups of resources would support a CSI-RS configuration with 16 antenna ports.

A first CSI-RS signal associated with a first CSI-RS resource configuration multiplexed using a respective OCC having a length of 8 or more over a respective number of antenna ports, a respective number of resource elements or respective sets of resource elements can be aggregated with the same CSI-RS signal associated with a second CSI-RS resource configuration multiplexed using the respective OCC having a length of 8 or more over the respective number of antenna ports, a respective number of resource elements or respective sets of resource elements.

For example, using an OCC-4 or OCC-8 code for spreading an 8 antenna port CSI-RS resource configuration can be realized by applying OCC-4 across adjacent resource elements over time and frequency. The OCC-4 based antenna port multiplexing is used with each CSI-RS resource configuration constituting a NZP CSI-RS resource with 12, 16 or more than 16 antenna ports or some other number of antenna ports that is a multiple of 4 or 8. Referring still to FIG. 5, it can be appreciated that there is shown a 4 CSI-RS resource configuration, that is, 4 resource elements constitute a CSI-RS configuration. A resource configuration is denoted or otherwise defined by a group or set of related resource elements. Taking, for example, the OFDM symbols 8 and 9, it can be appreciated that the resource elements defined by the subcarriers 11 and 10 constitute a CSI-RS resource configuration. A CSI-RS resource configuration is used to carry a respective CSI-RS signal, whose data units, such as bits or modulation symbols, have been spread using a respective OCC of length 4 or more over the related resource elements. Therefore, it can be appreciated that the resource block 502 of FIG. 5 comprises a number of possible CSI-RS resource configurations. In the illustrated example, three possible CSI-RS resource configurations are depicted. Suitably, a second CSI-RS resource configuration comprises the resource elements associated with OHM symbols 8 and 9 on subcarriers 5 and 4. The first and second CSI resource configurations comprise two sets of associated, or related, quadruplets of resource elements. A third CSI-RS resource configuration comprises the resource elements associated with OFDM symbols 8 and 9 on subcarriers 9 and 8. A fourth CSI-RS resource configuration comprises the resource elements associated with OFDM symbols 8 and 9 on subcarriers 3 and 2. The third and fourth CSI-RS resource configurations constitute two sets of associated, or related, quadruplets of resource elements. A fifth CSI-RS resource configuration comprises the resource elements associated with OFDM symbols 8 and 9 on subcarriers 7 and 6. A sixth CSI-RS resource configuration comprises the resource elements associated with OFDM symbols 8 and 9 on subcarriers 1 and 0. The fifth and sixth CSI-RS resource configurations constitute two sets of associated, or related, quadruplets of resource elements. Although the above embodiments refer to ODFM symbols 8 and 9, alternative OFDM symbols can be used. The foregoing embodiments constitute an 8 port CSI-RS resource configuration. It can be appreciated that both code division multiplexing and frequency division multiplexing is used to multiplex the antenna ports in an 8 antenna port CSI-RS resource configuration.

Figure 6:
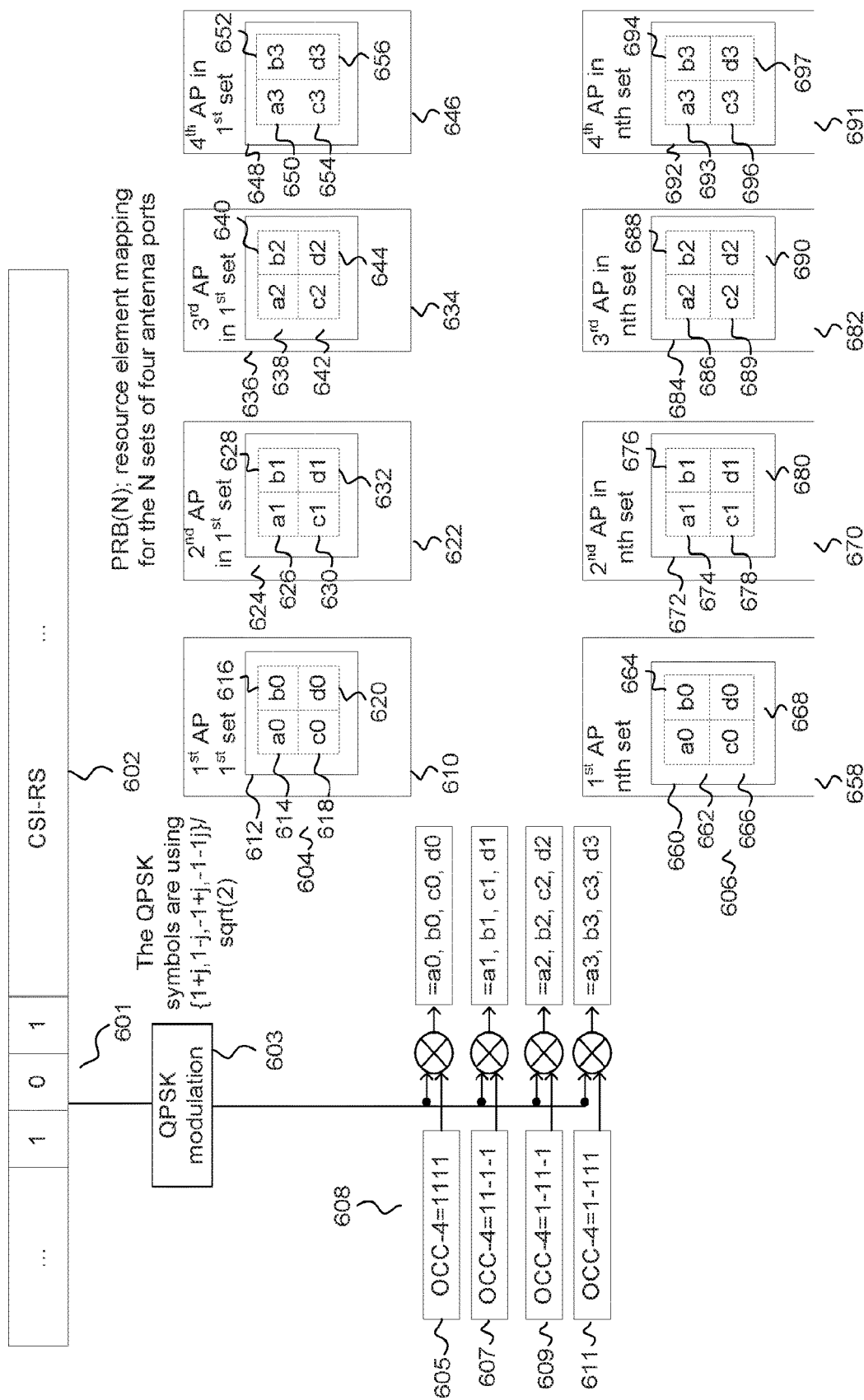
FIGS. 6 to 10 show antenna port multiplexing across respective resource elements according to embodiments.

Referring to FIG. 6, there is shown a view 600 of an embodiment of CSI-RS signal 602 multiplexing over CSI-RS resources 604 to 606 using a prescribed or corresponding OCC 608. In the embodiment illustrated, the OCC 608 has a length of 4, that is, the OCC is OCC-4. The CSI-RS resources 604 to 606 relate to a number of sets of a predetermined number of antenna ports (AP). In the embodiment shown, four antenna ports are used per set of CSI-RS resources or per CSI-RS resource configuration.

The first set 604 of CSI-RS resources comprises a resource block or resource configuration 610 corresponding to a $1^{st}$ antenna port of the $1^{st}$ set 604. The CSI-RS resource configuration 610 comprises a group 612 of a predetermined number of resource elements. In the embodiment depicted, the predetermined number of resource elements comprises four resource elements 614 to 620 labelled a0, b0, c0 and d0. The first set 604 of CSI-RS resources comprises a resource block or resource configuration 622 corresponding to a $2^{nd}$ antenna port of the $1^{st}$ set 604. The CSI-RS resource configuration 622 comprises a group 624 of a predetermined number of resource elements. In the embodiment depicted, the predetermined number of resource elements comprises four resource elements 626 to 632 labelled a1, b1, c1 and d1.

The first set 604 of CSI-RS resources comprises a resource block or resource configuration 634 corresponding to a $3^{rd}$ antenna port of the $1^{st}$ set 604. The CSI-RS resource configuration 634 comprises a group 636 of a predetermined number of resource elements. In the embodiment depicted, the predetermined number of resource elements comprises four resource elements 638 to 644 labelled a2, b2, c2 and d2.

The first set 604 of CSI-RS resources comprises a resource block or resource configuration 646 corresponding to a $4^{th}$ antenna port of the $1^{st}$ set 604. The CSI-RS resource configuration 646 comprises a group 648 of a predetermined number of resource elements. In the embodiment depicted, the predetermined number of resource elements comprises four resource elements 650 to 656 labelled a3, b3, c3 and d3.

Similarly, the nth set 606 of CSI-RS resources comprises a resource block or resource configuration 658 corresponding to a $1^{st}$ antenna port of the nth set 606. The CSI-RS resource configuration 658 comprises a group 660 of a predetermined number of resource elements. In the embodiment depicted, the predetermined number of resource elements comprises four resource elements 662 to 668 labelled a0, b0, c0 and d0.

The nth set 606 of CSI-RS resources comprises a resource block or resource configuration 670 corresponding to a $2^{nd}$ antenna port of the nth set 606. The CSI-RS resource configuration 670 comprises a group 672 of a predetermined number of resource elements. In the embodiment depicted, the predetermined number of resource elements comprises four resource elements 674 to 680 labelled a1, b1, c1 and d1.

The nth set 606 of CSI-RS resources comprises a resource block or resource configuration 682 corresponding to a $3^{rd}$ antenna port of the nth set 606. The CSI-RS resource configuration 682 comprises a group 684 of a predetermined number of resource elements. In the embodiment depicted, the predetermined number of resource elements comprises four resource elements 686 to 690 labelled a2, b2, c2 and d2.

The nth set 606 of CSI-RS resources comprises a resource block or resource configuration 691 corresponding to a $4^{th}$ antenna port of the nth set 606. The CSI-RS resource configuration 691 comprises a group 692 of a predetermined number of resource elements. In the embodiment depicted, the predetermined number of resource elements comprises four resource elements 693 to 697 labelled a3, b3, c3 and d3.

Embodiments can be realized in which the n sets of CSI-RS resource configurations comprises 4 sets of CSI-RS resource configurations, 8 set of CSI-RS resource configurations or some other power of 2 set of CSI-RS resource configurations.

It can be appreciated that the data units of a CSI-RS signal to be transmitted to a UE are processed using the OCC-4 608. In the illustrated embodiment three such data units 601 are shown. The data units can be modulated using a modulator 603 according to a prescribed modulation technique. Embodiments can be realized in which the prescribed modulation technique can be, for example, QPSK. The modulation technique can be another modulation technique such as, for example, QAM.

It can be appreciated that the CSI-RS data unit or modulation symbol is multiplied by or processed using a respective OCC-4 code according to a respective antenna port. In the illustrated embodiment, a first OCC-4 code 605 is used to produce the values, a0, b0, c0, d0, for the set of resource elements associated with the first antenna port in each set 604 to 606 of resource elements. Therefore, for example, assuming that the CSI-RS is represented as QPSK, or assuming that a binary sequence of the CSI-RS is to be represented using QPSK, that is, the depicted leading "1" followed by a "0" would be represented as 1-j, the result of processing the CSI-RS signal using the first OCC code 605 would be a set of signals a0=1-j, b0=1-j, c0=1-j, d0=1-j.

A second OCC-4 code 607 is used to produce the values, a1, b1, c1, d1, for the set of resource elements associated with the second antenna port in each set 604 to 606 of resource elements. A third OCC-4 code 609 is used to produce the values, a2, b2, c2, d2, for the set of resource elements associated with the third antenna port in each set 604 to 606 of resource elements. A fourth OCC-4 code 611 is used to produce the values, a3, b3, c3, d3, for the set of resource elements associated with the fourth antenna port in each set 604 to 606 of resource elements.

Each set of the resource elements is mapped onto, or relates to, the same physical resource block. Therefore, each the of resource elements corresponding to the resource blocks 610, 622, 634, 646, 658, 670, 682 and 691 relates or refers to a common resource block. The sets of resource elements within a set relate to the same resource elements, that is, the same ODFM symbol and the same subcarriers. Therefore, for example, resource element sets 612, 624, 636 and 648 relate to the same resource elements within the time and frequency domain, that is, they relate to resource elements of the same ODFM symbols and the same subcarriers. The foregoing applies to resource elements of any set. Therefore, resource element sets 660, 672, 684 and 692 relate to the same or common resource elements.

As between sets, the resource elements can vary. Therefore, for example, even though the resource elements of sets 612 and 660 relate to the same antenna port, those resource elements are or can be separated in the frequency domain, that is, they can use different subcarriers notwithstanding using the same OFDM symbols. The same applies to the resource elements associated with the other antenna ports as between sets such as, for example, the resource elements 624 associated with $2^{nd}$ antenna port of the $1^{st}$ set and the resource elements 672 associated with the $2^{nd}$ antenna port of the nth set.

The foregoing use of common resource elements as between antenna ports within a set and the use of different resource elements as between sets for commons antenna ports will be described with reference to and shown in FIGS. 7 to 9, which corresponds to FIG. 6 in the case of n=4.

Figure 7:
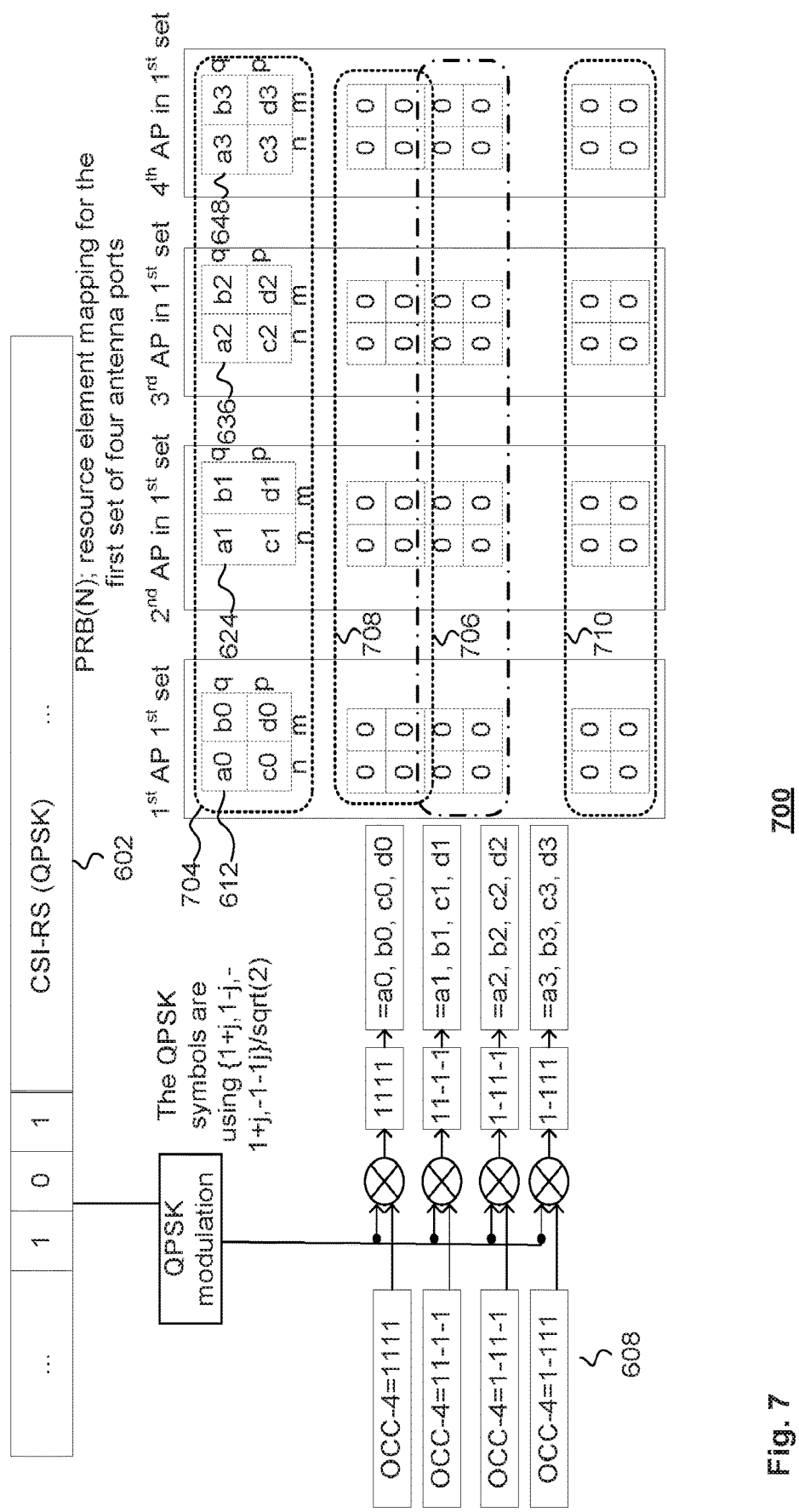

FIG. 7 shows a view 700 of the resource elements associated with a plurality of antenna ports of the $1^{st}$ set 604. As described above with reference to FIG. 6, the CSI-RS 602 is multiplexed using respective OCCs 608 of a prescribed length. In the embodiment illustrated the prescribed length can be four. The results of the multiplexing 702 are mapped to the resource elements of a prescribed, common, physical resource block. In the illustrated embodiment, the CSI-RS signal is multiplexed over common resource elements within the PRB even though the resource elements are shown as separate sets 612, 624, 636 and 648 respectively.

The set 704 of resource elements of the antenna ports of the $1^{st}$ set can be associated with a set of time domain resources such as, for example, ODFM symbols. The time domain resources can correspond to a set of time domain resources such as, for example, the nth and mth OFDM symbols. Additionally, or alternatively, the resource elements of the $1^{st}$ antenna port of the $1^{st}$ set can be associated with a set of frequency domain resources. The frequency domain resources can correspond to a set of frequency domain resources such as, for example, pth and qth subcarriers. In the embodiment illustrated m=(n+1) and q=(p+1), that is, the time and frequency domain resources are adjacent to one another across the antenna ports of a given set.

Also shown in FIG. 7 is one or more than one additional set of resources associated with the set of antenna ports. For example, in the depicted embodiment, a total of four sets 704 to 710 of resource elements are used. Each of the four sets 704 to 710 of resources corresponds to a set of resources associated with a set of antenna ports. Therefore, for example, the first set 704 of resources can correspond to the first set 604 of resources associated with a respective set of antenna ports described with reference to FIG. 6. Similarly, a fourth set 710 of resources can correspond to the nth set 606 of resources described with reference to FIG. 6, that is, in the present example, n=4, with the second 706 and third 708 sets of resources forming respective sets of resources associated with the prescribed set of antenna ports.

Within each set of resources 704 to 710, common resource elements of the PRB are used to bear or carry the signals or data associated with the OCC multiplexing, that is, associated with the sets (a0-d0), (a1-d1), (a2-d2) and (a3-d3). The signals or data conveyed using the common resources can be separated due to the OCC codes being orthogonal notwithstanding using common resource elements. Furthermore, the UE or other device, component or system can aggregate signals multiplexed across the sets of resources 704 to 710 according to any and all permutations.

Figure 8:
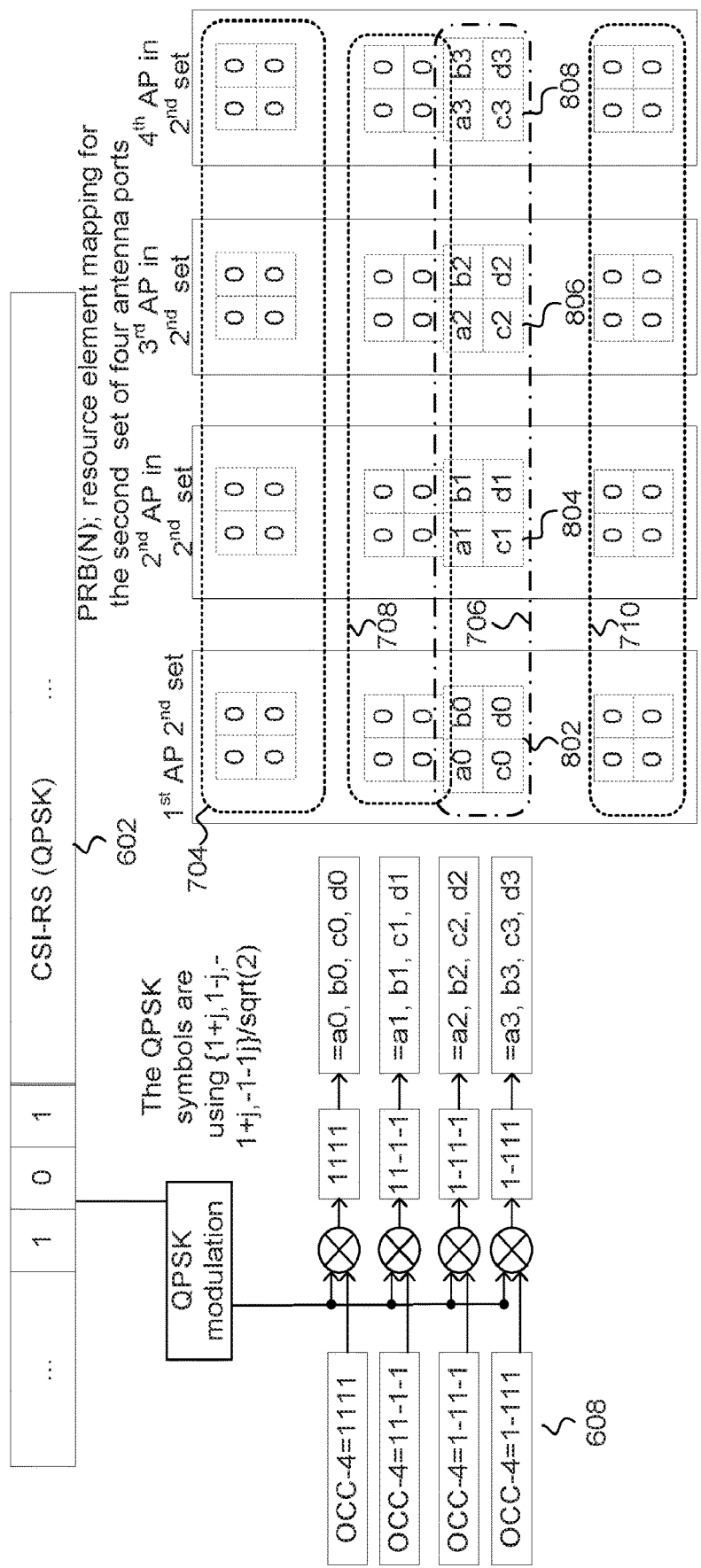
Figure 9:
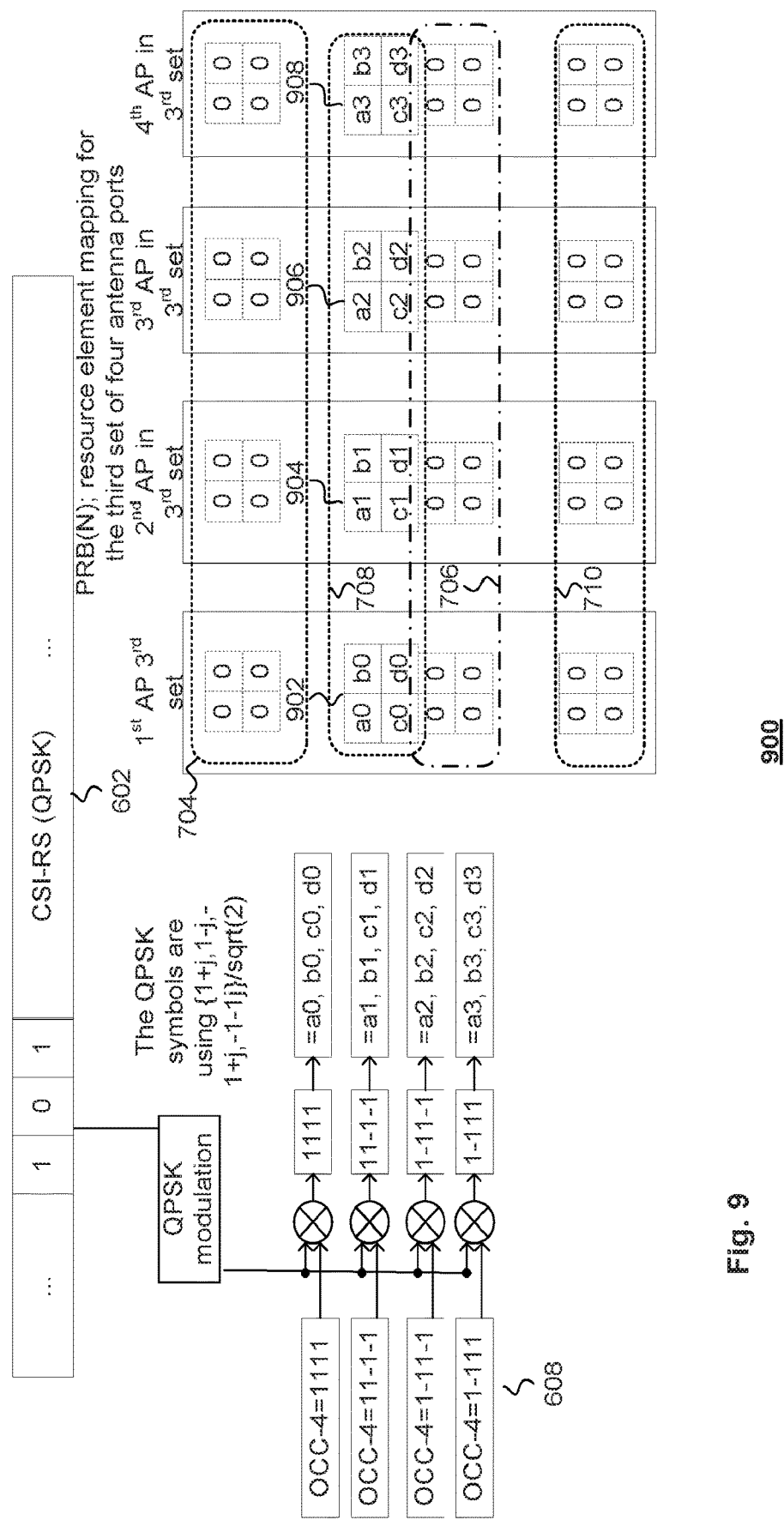

Referring to FIG. 8, there is shown a view 800 of the second set 706 of resource elements associated with a CSI-RS resource configuration for the antenna ports. The second set 706 of resources is configured to carry or bear CSI-RS signals or data. A plurality of groups of resource elements is associated with respective antenna ports. Therefore, it can be appreciated that a first group 802 of resource elements of the $2^{nd}$ set is associated with the $1^{st}$ W antenna port. A second group 804 of resource elements of the $2^{nd}$ set is associated with the $2^{nd}$ antenna port. A third group 806 of resource elements of the $2^{nd}$ set is associated with the $3^{rd}$ antenna port. A fourth group 808 of resource elements of the $2^{nd}$ set is associated with the 4th antenna port.

A given CSI-RS data unit or modulation symbol such as, for example, data or symbol 601 is multiplexed over the groups 802 to 808 of resource elements of antenna ports of the second set 706 using the prescribed OCCs 608 according to the mapping depicted. Referring to FIG. 9, there is shown a view 900 of the third set 708 of resource elements associated with a CSI-RS resource configuration for the antenna ports. The third set 708 of resources is configured to carry or bear CSI-RS signals or data. A plurality of groups of resource elements is associated with respective antenna ports. Therefore, it can be appreciated that a first group 902 of resource elements of the third set is associated with the $1^{st}$ antenna port. A second group 904 of resource elements of the third set is associated with the $2^{nd}$ antenna port. A third group 906 of resource elements of the third set is associated with the third antenna port. A fourth group 908 of resource elements of the third set is associated with the 4th antenna port.

Figure 10:
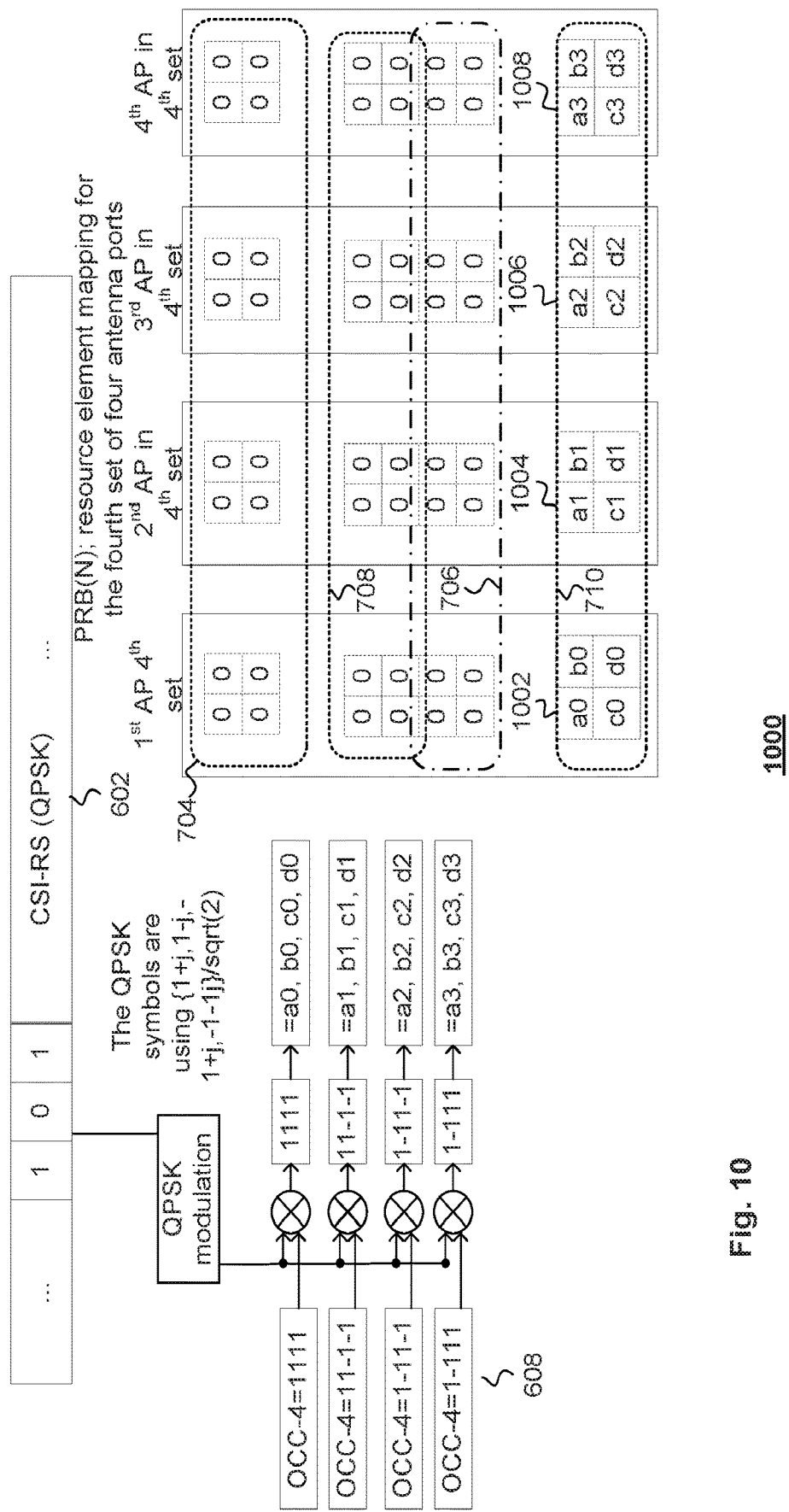

A given CSI-RS data unit or modulation symbol such as, for example, data or symbol 601 is multiplexed over the groups 902 to 908 of resource elements of antenna ports of the third set 708 using the prescribed OCCs 608 according to the mapping depicted. Referring to FIG. 10, there is shown a view 1000 of the fourth set 710 of resource elements associated with a CSI-RS resource configuration for the antenna ports. The fourth set 710 of resources is configured to carry or bear CSI-RS signals or data. A plurality of groups of resource elements is associated with respective antenna ports. Therefore, it can be appreciated that a first group 1002 of resource elements of the fourth set is associated with the $1^{st}$ antenna port. A second group 1004 of resource elements of the fourth set is associated with the $2^{nd}$ antenna port. A third group 1006 of resource elements of the fourth set is associated with the third antenna port. A fourth group 1008 of resource elements of the fourth set is associated with the 4th antenna port.

A given CSI-RS data unit or modulation symbol such as, for example, data or symbol 601 is multiplexed over the groups 1002 to 1008 of resource elements of antenna ports of the fourth set 710 using the prescribed OCCs 608 according to the mapping depicted.

The configuration of such CSI-RS resources is communicated to a UE using respective signalling such as, for example, RRC signalling. The configuration of the above CSI-RS resources, which is known as CSI-RS resource configuration, can be prescribed by a higher layer, such as for example, L3 or above.

Figure 11:
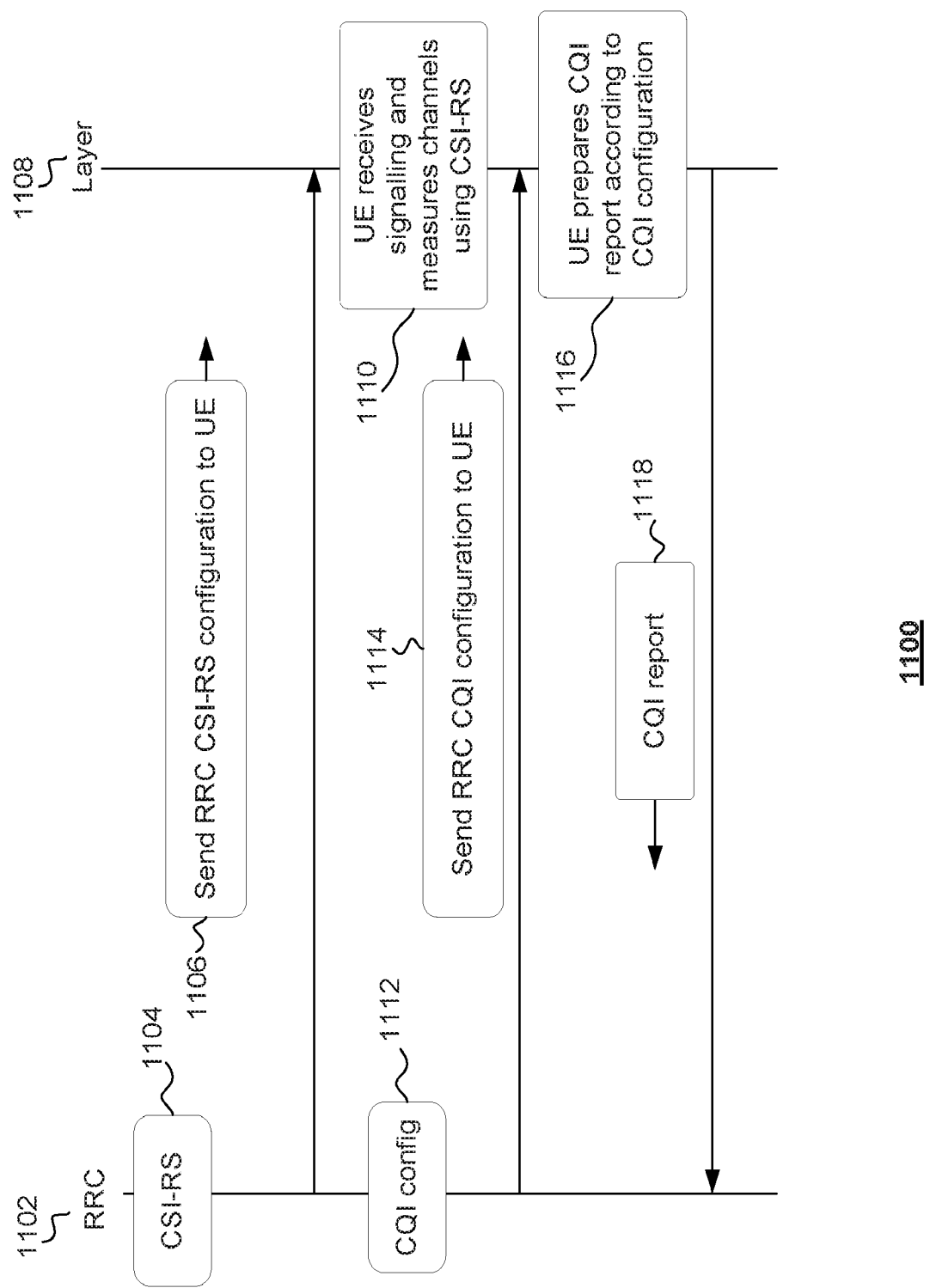
FIG. 11 illustrates a protocol exchange according to an embodiment.

Referring to FIG. 11, there is shown a view 1100 of a protocol for communicating CSI-RS resource configuration. The prescribed CSI-RS resource configuration comprises information relating to a target resource configuration for transmitting a CSI-RS signal. The CSI-RS resource configuration can comprises at least one or more of number of antenna ports, subframe configuration and OCC for antenna port multiplexing taken jointly and severally in any and all permutations. Embodiments can be realized in which the configuration is a higher layer configuration prescribed by, or associated with, a higher layer such as, for example, L3 or above. Embodiments can be realized in which the protocol is realized using the Radio Resource Control (RRC) messages or signalling.

A determination can be made by a radio resource controller 1102 regarding a prescribed CSI-RS resource configuration 1104.

A message 1106 for communicating the prescribed CSI-RS resource configuration or CSI-RS resource configurations is output for transmission to a predetermined layer 1108 of a device such as, for example, a UE. The UE processes, at 1110, the RRC CSI-RS configuration and passes the data to a relevant higher layer such as, for example, L3 or above. The UE can then be configured to receive and process the CSI-RS signals multiplexed across multiple antenna ports and/or to aggregate the results and perform channel estimation using the above described channel estimator 130 or component 200. One skilled in the art will appreciate that communicating the length of the OCC provides a receiving UE with an indication of how to process an associated CSI-RS to recover one or more than one CSI-RS previously spread over a set of resource elements.

The UE can commence channel measurements and/or estimation. The RRC 1102 can determine, at 1112, a prescribed CQI report. The RRC 1102 can signal, at 1114, a desired CQI configuration to the UE. In response to receiving the desired CSI configuration, the UE 1108 prepares, at 1116, a CQI report and forwards the CQI report to the RRC at 1118, where it can be processed to improve communications between an eNB and the UE. The channel measurement and/or estimation can also be used to influence or determine other CSI information such as, for example, at least one or more than one of Rank Index (RI) and Precoding Matrix Indicator (PMI) as well as, or as an alternative to, CQI.

Figure 12:
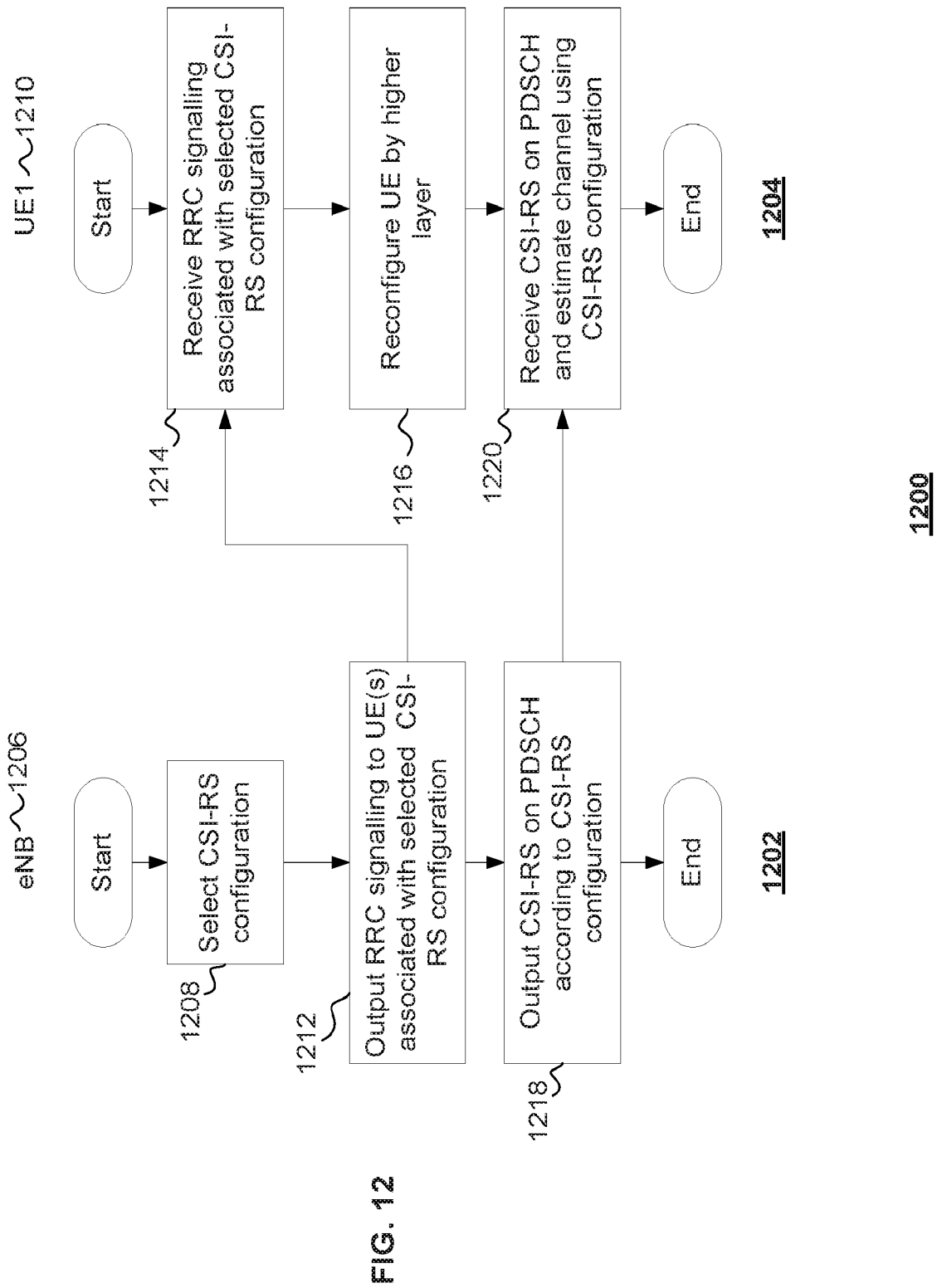
FIG. 12 depicts a number of flowcharts according to embodiments.

Referring to FIG. 12, there is shown a view 1200 of flowcharts 1202 and 1204 of embodiments for configuring at least one device such as, for example, a UE to operate using multiple antenna port CSI-RS multiplexing according to CSI-RS resource configuration. An apparatus, such as, for example, an eNB 1206, which can be the above eNB 102, or an apparatus for such an eNB, configures or selects, at 1208, a multi-port CSI-RS resource configuration for transmission to a UE 1210, which can be the above UE 104, using higher layer signalling such as, for example, RRC signalling.

The eNB 1206 transmits, at 1212, a message such as, for example, a RRC message or messages, indicating a prescribed CSI-RS resource configuration to the UE 1210. At 1214, the UE 1210 receives the message associated with the selected multi-antenna port CSI-RS resource configuration and is reconfigured, at 1216, by a higher layer to operate or otherwise process the CSI-RS signals according to the antenna CSI-RS mapping. The higher layer can be, for example, Layer 3 or above, such as, for example, the RRC layer, At 1218, the apparatus such as, for example, the above eNB, outputs data or signals for transmission to the UE 1210, or transmits a channel containing the above CSI-RS resource configurations to the UE 1210. The channel can be, for example, the PDSCH.

At 1220, the UE 1210 receives and decodes prescribed CSI-RS signals in accordance with the CSI-RS resource configuration and can use the CSI-RS to estimate one or more characteristics of one or more than one wireless communication channel or a parameter associated with such a channel.

The above flowcharts can be realized in the form of, for example, machine executable instructions executable by processor circuitry.

Figure 13:
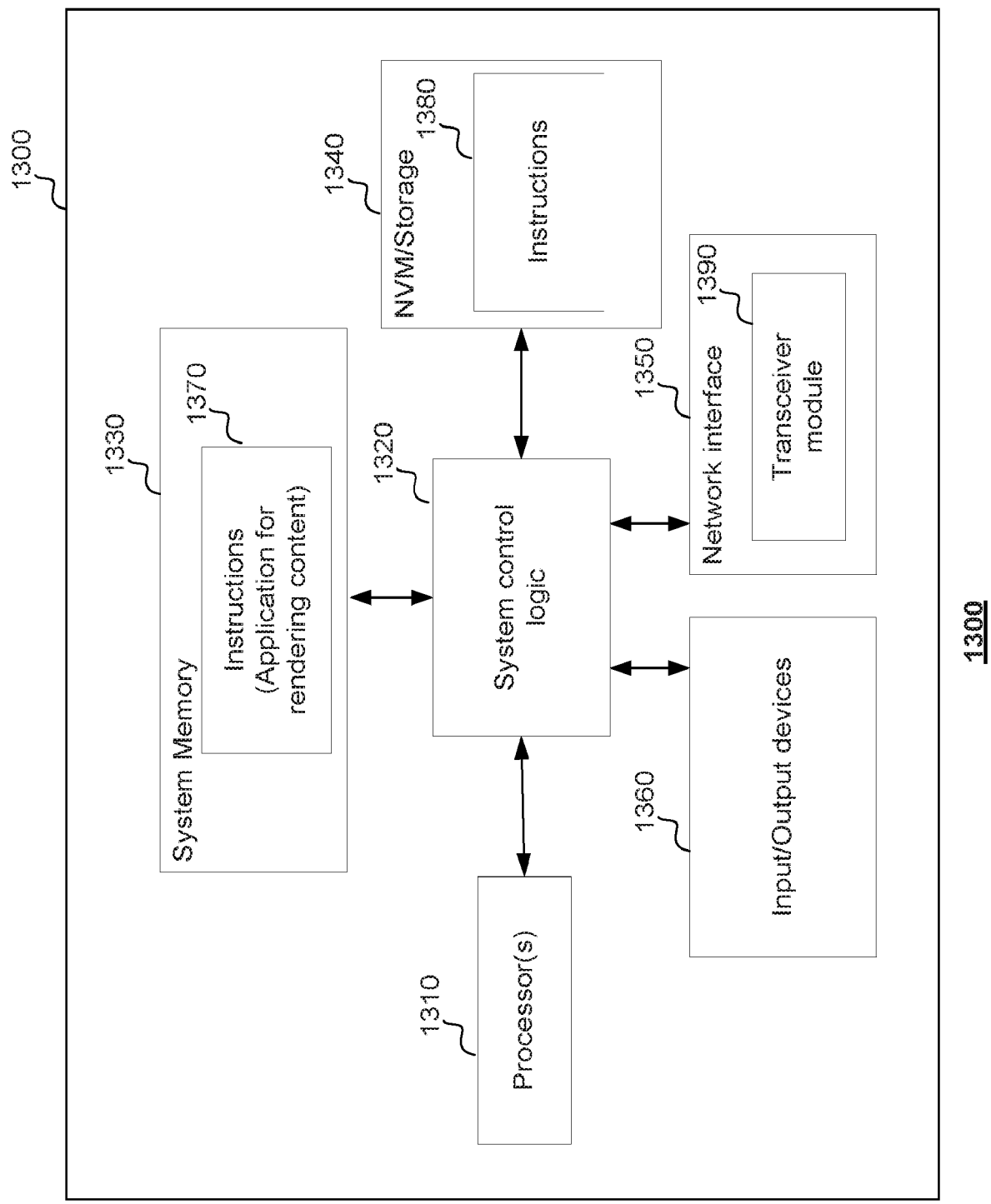
FIG. 13 illustrates an apparatus according to an embodiment.

FIG. 13 illustrates, for one embodiment, an example system 1300 for realizing a UE 104 or component thereof. The system 1300 comprises one or more processor(s) 1310, system control logic 1320 coupled with at least one of the processor(s) 1310, system memory 1330 coupled with system control logic 1320, non-volatile memory (NVM)/storage 1340 coupled with system control logic 1320, and a network interface 1350 coupled with system control logic 1320. The system 1300 control logic 1320 may also be coupled to Input/Output devices 1360. The system can be arranged to receive and process one or more than one instance of the above NZP CSI-RS signals.

Processor(s) 1310 may include one or more single-core or multi-core processors. Processor(s) 1310 may include any combination of general-purpose processors and/or dedicated processors (e.g., graphics processors, application processors, baseband processors, etc.). Processors 1310 may be operable to carry out the above described methods using suitable instructions or programs (i.e. to operate via use of processor, or other logic, instructions). The instructions may be stored in system memory 1330, as system memory instructions 1370, or, additionally or alternatively, may be stored in (NVM)/storage 1340, as NVM instructions 1380.

System control logic 1320, for one embodiment, may include any suitable interface controllers to provide for any suitable interface to at least one of the processor(s) 1310 and/or to any suitable device or component in communication with system control logic 1320. System control logic 1320, for one embodiment, may include one or more memory controller(s) to provide an interface to system memory 1330. System memory 1330 may be used to load and store data and/or instructions for the system 1300. A system memory 1330. for one embodiment, may include any suitable volatile memory, such as suitable dynamic random access memory (DRAM), for example.

NVM/storage 1340 may include one or more than one tangible, non-transitory computer-readable medium used to store data and/or instructions, for example. NVM/storage 1340 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1340 may include a storage resource that is physically part of a device on which the system 1300 is installed or it may be accessible by, but not necessarily a part of, the system 1300. For example, the NVM/storage 1340 may be accessed over a network via the network interface 1350.

System memory 1330 and NVM/storage 1340 may respectively include, in particular, temporal and persistent, that is, non-transient, copies of, for example, the instructions 1370 and 1380, respectively. Instructions 1370 and 1380 may include instructions that when executed by at least one of the processor(s) 1310 result in the system 1300 implementing the processing of the method(s) of any embodiment described herein or as shown in any of the figures. In some embodiments, instructions 1370 and 1380, or hardware, firmware, and/or software components thereof, may additionally/alternatively be located in the system control logic 1320, the network interface 1350, and/or the processor(s) 1310.

Network interface 1350 may have a transceiver module 1390 to provide a radio interface for system 1300 to communicate over one or more network(s) (e.g. wireless communication network) and/or with any other suitable device. The transceiver 1390 may implement receiver module that performs the above processing of the received signals to realize interference mitigation. In various embodiments, the transceiver 1390 may be integrated with other components of the system 1300. For example, the transceiver 1390 may include a processor of the processor(s) 1310, memory of the system memory 1330, and NVM/Storage of NVM/Storage 1340. Network interface 1350 may include any suitable hardware and/or firmware. Network interface 1350 may be operatively coupled to the antenna, or to one or more than one antenna to provide SISO or a multiple input, multiple output radio interface. Network interface 1350 for one embodiment may include, for example, a network adapter, a wireless network adapter, a telephone modem, and/or a wireless modem.

For one embodiment, at least one of the processor(s) 1310 may be packaged together with logic for one or more controller(s) of the system control logic 1320. For one embodiment, at least one of the processor(s) 1310 may be packaged together with logic for one or more controllers of the system control logic 1320 to form a System in Package (SiP). For one embodiment, at least one of the processor(s) 1340 may be integrated on the same die with logic for one or more controller(s) of the system control logic 1320. For one embodiment, at least one of the processor(s) 1310 may be integrated on the same die with logic for one or more controller(s) of system control logic 1320 to form a System on Chip (SoC).

Figure 14:
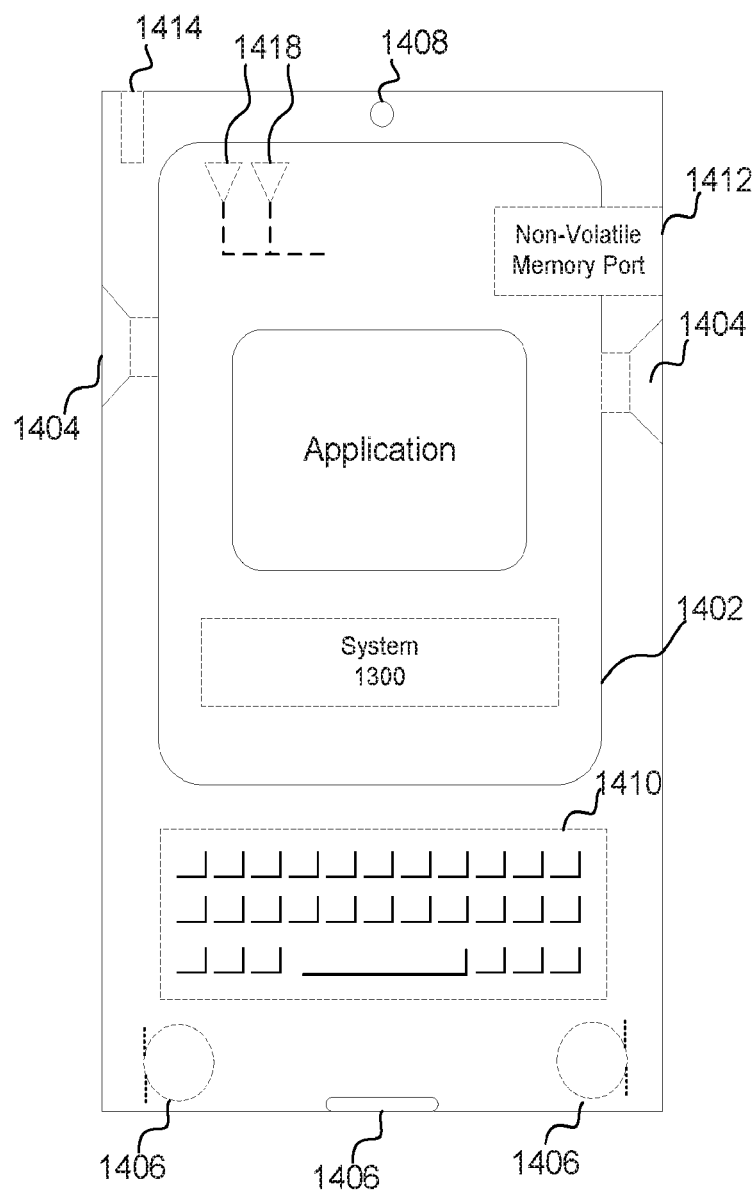
FIG. 14 depicts a user equipment according to an embodiment.

In various embodiments, the I/O devices 1360 may include user interfaces designed to enable user interaction with the system 1300, peripheral component interfaces designed to enable peripheral component interaction with the system 1300, and/or sensors designed to determine environmental conditions and/or location information related to the system 1300. FIG. 14 shows an embodiment in which the system 1300 can be used to realize a UE such as UE 104, 200. Such a user equipment 104, 200 can be realized in form of a mobile device 1400.

In various embodiments, user interfaces of the mobile device 1400 could include, but are not limited to, a display 1402 (e.g., a liquid crystal display, a touch screen display, etc.), a speaker 1404, a microphone 1406, one or more cameras 1408 (e.g., a still camera and/or a video camera), a flashlight (e.g., a light emitting diode), and a keyboard 1410. In various embodiments, one or more than one peripheral component interface may be provided including, but not limited to, a non-volatile memory port 1412, an audio jack 1414, and a power supply interface 1416.

In various embodiments, one or more sensors may be provided including, but not limited to, a gyro sensor, an accelerometer, a proximity sensor, an ambient light sensor, and a positioning unit. The positioning unit may also be part of, or interact with, the network interface to communicate with components of a positioning network, e.g., a global positioning system (GPS) satellite.

In various embodiments, the system 1400 may be a mobile computing device such as, but not limited to, a laptop computing device, a tablet computing device, a netbook, a mobile phone, etc. In various embodiments, the system 1400 may have more or fewer components, and/or different architectures.

As used herein, the term "circuitry" may refer to, be part of, or include an Application Specific integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 15:
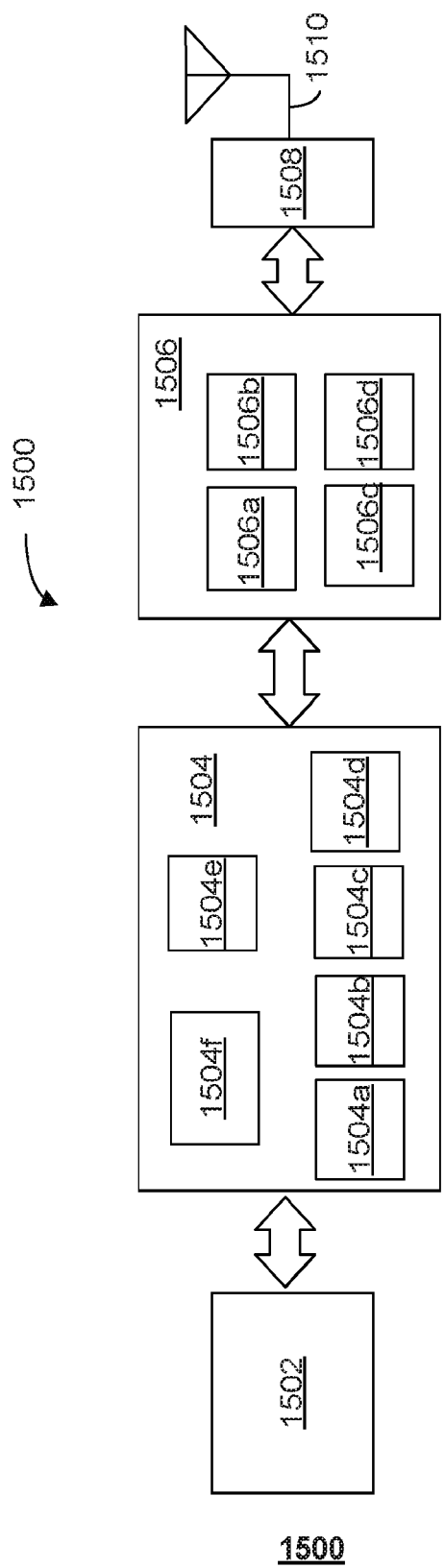
FIG. 15 depicts a user equipment according to an embodiment.

Embodiments described herein may be implemented into a system using any suitably configured hardware and/or software. FIG. 15 illustrates, for one embodiment, example components of a User Equipment (UE) device 1500. In some embodiments, the UE device 1500 may include application circuitry 1502, baseband circuitry 1504, Radio Frequency (RF) circuitry 1506, front-end module (FEM) circuitry 1508 and one or more antennas 1510, coupled together at least as shown. It will be appreciated that embodiments can be realized in which at least one of the application circuitry 1502 or baseband circuitry 1504 can implement or be used to implement one or more elements of FIG. 1.

The application circuitry 1502 may include one or more application processors. For example, the application circuitry 1502 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1504 may include circuitry such as, but not limited to, one or more single-core or multi-core processors. The baseband circuitry 1504 may include one or more baseband processors and/or control logic to process baseband signals received from a receive signal path of the RF circuitry 1506 and to generate baseband signals for a transmit signal path of the RF circuitry 1506. Baseband processing circuitry 1504 may interface with the application circuitry 1502 for generation and processing of the baseband signals and for controlling operations of the RF circuitry 1506. For example, in some embodiments, the baseband circuitry 1504 may include a second generation (2G) baseband processor 1504a, third generation (3G) baseband processor 1504b, fourth generation (4G) baseband processor 1504c, and/or other baseband processor(s) 1504d for other existing generations, generations in development or to be developed in the future (e.g., fifth generation (5G), 6G, etc.). The baseband circuitry 1504 (e.g., one or more of baseband processors 1504a-d) may handle various radio control functions that enable communication with one or more radio networks via the RF circuitry 1506. The radio control functions may include, but are not limited to, signal modulation/demodulation, encoding/decoding, radio frequency shifting, etc. In some embodiments, modulation/demodulation circuitry of the baseband circuitry 1504 may include Fast-Fourier Transform (FFT), precoding, and/or constellation mapping/demapping functionality. In some embodiments, encoding/decoding circuitry of the baseband circuitry 1504 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1504 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1504e of the baseband circuitry 1504 may be configured to run elements of the protocol stack for signaling of the PHY, MAC, RLC, PDCP and/or RRC layers. In some embodiments, the baseband circuitry may include one or more audio digital signal processor(s) (DSP) 1504f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1504 and the application circuitry 1502 may be implemented together such as, for example, on a system on a chip (SOC).

In some embodiments, the baseband circuitry 1504 may provide for communication compatible with one or more radio technologies. For example, in some embodiments, the baseband circuitry 1504 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1504 is configured to support radio communications of more than one wireless protocol may be referred to as multi-mode baseband circuitry.

RF circuitry 1506 may enable communication with wireless networks using modulated electromagnetic radiation through a non-solid medium. In various embodiments, the RF circuitry 1506 may include switches, filters, amplifiers, etc. to facilitate the communication with the wireless network. RE circuitry 1506 may include a receive signal path which may include circuitry to down-convert RF signals received from the FEM circuitry 1508 and provide baseband signals to the baseband circuitry 1504. RF circuitry 1506 may also include a transmit signal path which may include circuitry to up-convert baseband signals provided by the baseband circuitry 1504 and provide RF output signals to the FEM circuitry 1508 for transmission.

In some embodiments, the RF circuitry 1506 may include a receive signal path and a transmit signal path. The receive signal path of the RF circuitry 1506 may include mixer circuitry 1506a, amplifier circuitry 1506b and filter circuitry 1506c. The transmit signal path of the RE circuitry 1506 may include filter circuitry 1506c and mixer circuitry 1506a. RF circuitry 1506 may also include synthesizer circuitry 1506d for synthesizing a frequency for use by the mixer circuitry 1506a of the receive signal path and the transmit signal path. In some embodiments, the mixer circuitry 1506a of the receive signal path may be configured to down-convert RF signals received from the FEM circuitry 1508 based on the synthesized frequency provided by synthesizer circuitry 1506d. The amplifier circuitry 1506b may be configured to amplify the down-converted signals and the filter circuitry 1506c may be a low-pass filter (LPF) or band-pass filter (BPF) configured to remove unwanted signals from the down-converted signals to generate output baseband signals. Output baseband signals may be provided to the baseband circuitry 1504 for further processing. In some embodiments, the output baseband signals may be zero-frequency baseband signals. In some embodiments, mixer circuitry 1506a of the receive signal path may comprise passive mixers, although the scope of the embodiments is not limited in this respect.

In some embodiments, the mixer circuitry 1506a of the transmit signal path may be configured to up-convert input baseband signals based on the synthesized frequency provided by the synthesizer circuitry 1506d to generate RF output signals for the FEM circuitry 1508. The baseband signals may be provided by the baseband circuitry 1504 and may be filtered by filter circuitry 1506c. The filter circuitry 1506c may include a low-pass filter (LPF), although the scope of the embodiments is not limited in this respect.

In some embodiments, the mixer circuitry 1506a of the receive signal path and the mixer circuitry 1506a of the transmit signal path may include two or more mixers and may be arranged for quadrature down-conversion and/or up-conversion respectively. In some embodiments, the mixer circuitry 1506a of the receive signal path and the mixer circuitry 1506a of the transmit signal path may include two or more mixers and may be arranged for image rejection (e.g., Hartley image rejection). In some embodiments, the mixer circuitry 1506a of the receive signal path and the mixer circuitry 1506a may be arranged for direct down-conversion and/or direct up-conversion, respectively. In some embodiments, the mixer circuitry 1506a of the receive signal path and the mixer circuitry 1506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1506 may include analog-to-digital converter (ADC) and digital-to-analog converter (DAC) circuitry and the baseband circuitry 1504 may include a digital baseband interface to communicate with the RF circuitry 1506.

In some dual-mode embodiments, a separate radio IC circuitry may be provided for processing signals for each spectrum, although the scope of the embodiments is not limited in this respect.

In some embodiments, the synthesizer circuitry 1506d may be a fractional-N synthesizer or a fractional N/N+1 synthesizer, although the scope of the embodiments is not limited in this respect as other types of frequency synthesizers may be suitable. For example, synthesizer circuitry 1506d may be a delta-sigma synthesizer, a frequency multiplier, or a synthesizer comprising a phase-locked loop with a frequency divider.

The synthesizer circuitry 1506d may be configured to synthesize an output frequency for use by the mixer circuitry 1506a of the RE circuitry 1506 based on a frequency input and a divider control input. In some embodiments, the synthesizer circuitry 1506d may be a fractional N/N+1 synthesizer.

In some embodiments, frequency input may be provided by a voltage controlled oscillator (VCO). Divider control input may be provided by either the baseband circuitry 1504 or the applications processor 1502 depending on the desired output frequency. In some embodiments, a divider control input (e.g., N) may be determined from a look-up table based on a channel indicated by the applications processor 1502.

Synthesizer circuitry 1506d of the RF circuitry 1506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1506 may include an IQ/polar converter.

FEM circuitry 1508 may include a receive signal path which may include circuitry configured to operate on RF signals received from one or more antennas 1510, amplify the received signals and provide the amplified versions of the received signals to the RF circuitry 1506 for further processing. FEM circuitry 1508 may also include a transmit signal path which may include circuitry configured to amplify signals for transmission provided by RE circuitry 1506 for transmission by one or more of the one or more antennas 1510.

In some embodiments, the FEM circuitry 1508 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RE signals as an output (e.g., to the RE circuitry 1506). The transmit signal path of the FEM circuitry 1508 may include a power amplifier (PA) to amplify input RF signals (e.g., provided by RF circuitry 1506), and one or more filters to generate RF signals for subsequent transmission (e.g., by one or more of the one or more antennas 1510.

In some embodiments, the UE device 1500 may include additional elements such as, for example, memory/storage, display, camera, sensor, and/or input/output (I/O) interface.

In various embodiments, the UE and/or the eNB may include a plurality of antennas to implement a multiple-input-multiple-output (MIMO) transmission system, which may operate in a variety of MIMO modes, including single-user MIMO (SU-MIMO), multi-user MIMO (MU-MIMO), closed loop MIMO, open loop MIMO or variations of small antenna processing. The UE may provide some type of channel state information (CSI) feedback to the eNB via one or more up link channels, and the eNB may adjust one or more down link channels based on the received CSI feedback. The feedback accuracy of the CSI may affect the performance of the MIMO system.

In various embodiments, the uplink channels and the downlink channels may be associated with one or more frequency bands, which may or may not be shared by the uplink channels and the downlink channels. The one or more frequency bands may be further divided into one or more subbands, which may or may not be shared by the uplink and downlink channels. Each frequency subband, one or more aggregated subbands, or the one or more frequency bands for the uplink or downlink channels (wideband) may be referred to as a frequency resource.

In various embodiments, the UE may transmit CSI feedback to the eNB. The CSI feedback may include information related to channel quality index (CQI), precoding matrix indicator (PMI), and rank indication (RI). PMI may reference, or otherwise uniquely identify, a precoder within the codebook. The eNB may adjust the downlink channel based on the precoder referenced by the PMI.

The components and features of the above eNBs and UEs may be implemented using any combination of discrete circuitry, application specific integrated circuits (ASICs), logic gates and/or single chip architectures. Further, the features of UE may be implemented using microcontrollers, programmable logic arrays and/or microprocessors or any combination of the foregoing where suitably appropriate. It is noted that hardware, firmware and/or software elements may be collectively or individually referred to as "logic" or "circuit".

The various embodiments may be used in a variety of applications including transmitters and receivers of a radio system, although the embodiments are not limited in this respect. Radio systems specifically included within the scope of the present application include, but are not limited to, network interface cards (NICs), network adaptors, fixed or mobile client devices, relays, eNodeB or transmit points, femtocells, gateways, bridges, hubs, routers, access points, or other network devices. Further, the radio systems within the scope of the embodiments may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

Figure 16:
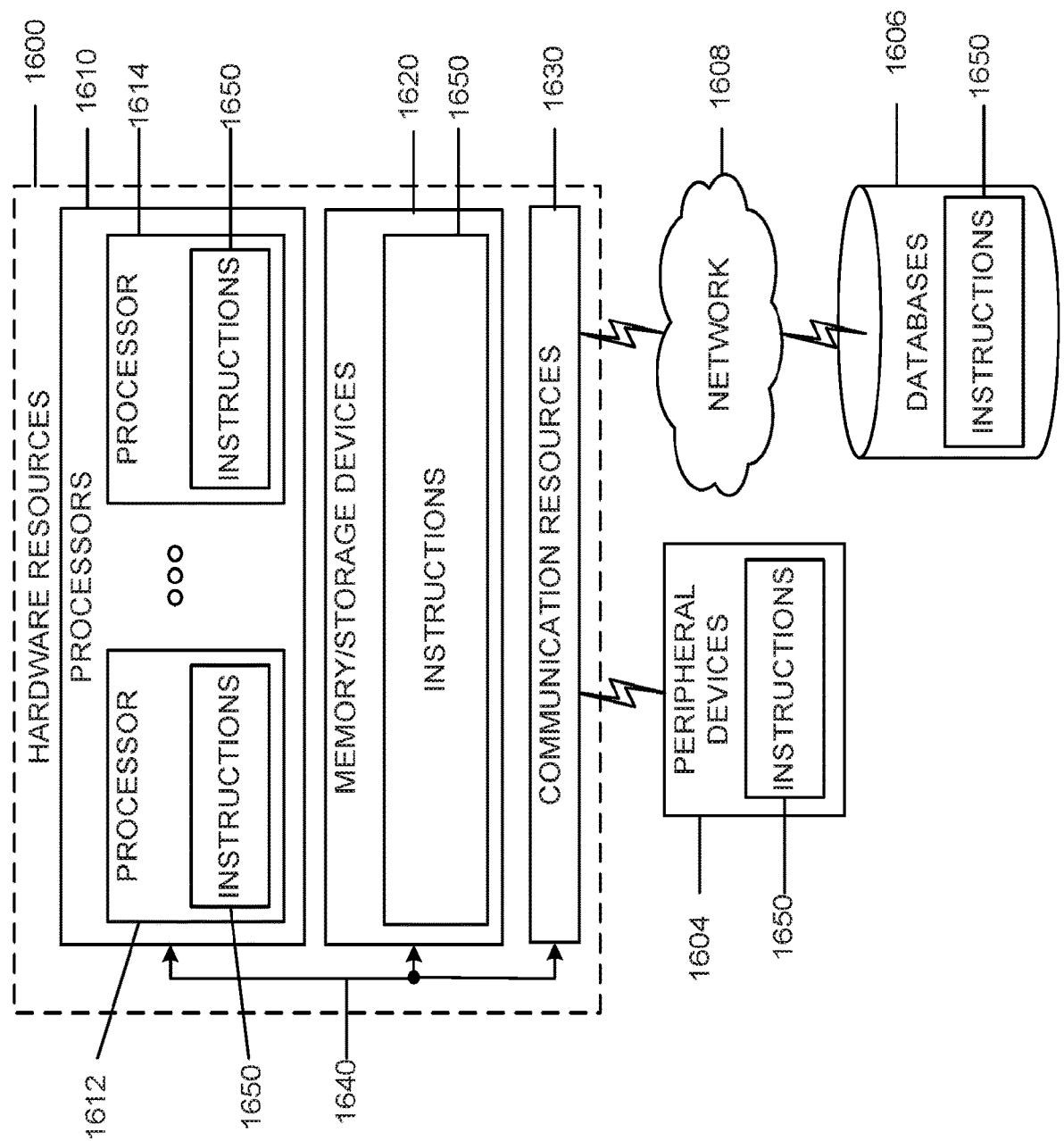
FIG. 16 shows block diagram illustrating components according to some example embodiments.

FIG. 16 is a block diagram illustrating components, according to some example embodiments, able to read instructions from a machine-readable or computer-readable medium (e.g., a machine-readable storage medium) and perform any one or more of the methodologies discussed herein. Specifically, FIG. 16 shows a diagrammatic representation of hardware resources 1600 including one or more processors (or processor cores) 1610, one or more memory/storage devices 1620, and one or more communication resources 1630, each of which are communicatively coupled via a bus 1640.

The processors 1610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1612 and a processor 1614. The memory/storage devices 1620 may include main memory, disk storage, or any suitable combination thereof.

The communication resources 1630 may include interconnection and/or network interface components or other suitable devices to communicate with one or more peripheral devices 1604 and/or one or more databases 1606 via a network 1608. For example, the communication resources 1630 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1650 may comprise software, a program, an application, an applet, an app, or other executable code for causing at least any of the processors 1610 to perform any one or more of the methodologies discussed herein. The instructions 1650 may reside, completely or partially, within at least one of the processors 1610 (e.g., within the processor's cache memory), the memory/storage devices 1620, or any suitable combination thereof. Furthermore, any portion of the instructions 1650 may be transferred to the hardware resources 1600 from any combination of the peripheral devices 1604 and/or the databases 1606. Accordingly, the memory of processors 1610, the memory/storage devices 1620, the peripheral devices 1604, and the databases 1606 are examples of computer-readable and machine-readable media.

It will be appreciated that embodiments can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or machine readable storage such as, for example, DVD, memory stick, chip, electronic device or solid state medium. It will be appreciated that the storage devices and storage media are embodiments of machine-readable storage, for example, non-transitory machine-readable storage, that are suitable for storing a program or programs comprising instructions that, when executed, implement embodiments described and claimed herein. Accordingly, embodiments provide machine executable code for implementing a system, apparatus, eNB, UE, device or method as described herein or as claimed herein and machine readable storage storing such a program or programs. Still further, such programs may be conveyed electronically via any medium such as a communication signal carried over a wired or wireless connection and embodiments suitably encompass the same.

In any or all of the above embodiments, it can be appreciated that a given serving cell can be configured with a predetermined number of parameter sets by higher layer signalling to support a UE decoding the PDSCH or EPDDCH in accordance with a predetermined message or information element such as at least one of a predetermined format DCI intended for the UE or a PDSCH configuration information element. The PDSCH configuration information element can specify at least one of a common PDSCH configuration or a UE-specific PDSCH configuration.

Embodiments are also provided according to the following examples:

Example 1 may include an apparatus for a User Equipment (UE) for processing a Channel State Information Reference (CSI-RS) signal associated with a prescribed CSI-RS resource configuration, comprising CSI-RS resources, relating to a predetermined plurality of antenna ports; the apparatus comprising circuitry to: process data associated with the prescribed CSI-RS resource configuration relating to the predetermined plurality of antenna ports, said CSI-RS resource configuration comprising multiplexing data providing an indication of the multiplexing of the CSI-RS signal over the CSI-RS resources; demultiplex data associated with a CSI-RS signal conveyed using the CSI-RS resources according to the CSI-RS resource configuration; and perform a channel estimation using the data associated with the CSI-RS signal.

Example 2 may include the apparatus of example 1 or some other example herein, in which the multiplexing data comprises a prescribed length multiplexing code.

Example 3 may include the apparatus of example 2 or some other example herein, in which the prescribed length multiplexing code is an orthogonal cover code with a length of at least one or more than one of two, four or eight.

Example 4 may include the apparatus of examples 1 to 3 or some other example herein, in which the CSI-RS signal is a Non-Zero Power Channel State Reference Signal.

Example 5 may include the apparatus of examples 1 to 4 or some other example herein, in which the predetermined plurality of antenna ports comprises at least one of four or eight antenna ports.

Example 6 may include the apparatus of examples 1 to 5 or some other example herein, comprising circuitry to: aggregate at least two of CSI-RS resources and CSI-RS signals.

Example 7 may include the apparatus of examples 1 to 6 or some other example herein, in which the CSI-RS resources comprise a plurality of resource elements of a physical resource block.

Example 8 may include the apparatus of example 7 or some other example herein, in which the CSI-RS resources comprise resource elements having a predetermined distribution in at least one of the time and frequency domains.

Example 9 may include the apparatus of example 8 or some other example herein, in which the predetermined distribution in at leak one of the time domain and frequency domain comprises at least one or more than one of adjacent or non-adjacent time domain resources or adjacent or non-adjacent frequency domain resources.

Example 10 may include the apparatus of examples 1 to 9 or some other example herein, in which the CSI-RS resource configuration comprises a plurality of sets of CSI-RS resource configurations.

Example 11 may include the apparatus of example 10 or some other example herein, in which the plurality of sets of CSI-RS resource configurations comprises at least a first set of CSI-RS configurations having a first respective number of CSI-RS ports.

Example 12 may include the apparatus of example 11 or some other example herein, in which said at least a first set of CSI-RS configurations comprises at least one or more than one of CSI-RS configurations 1, 2, 3, 6, 7, 8, 20, 21, 22, 23, 24 or 25 taken jointly and severally in any and all permutations.

Example 13 may include the apparatus of either of examples 11 and 12 or some other example herein, in which the first respective number of CSI-RS ports comprises four CSI-RS ports.

Example 14 may include the apparatus of example 10 or some other example herein, in which the plurality of sets of CSI-RS resource configurations comprises at least a second set of CSI-RS configurations having a second respective number of CSI-RS ports.

Example 15 may include the apparatus of example 14 or some other example herein, in which said at least a second set of CSI-RS configurations comprises at least one or more than one of CSI-RS configurations 1, 2, 3, 20, 21 or 22 taken jointly and severally in any and all permutations.

Example 16 may include the apparatus of either of examples 14 and 15 or some other example herein, in which the second respective number of CSI-RS ports comprises eight CSI-RS ports.

Example 17 may include the apparatus of examples 1 to 16 or some other example herein, in which said data associated with the prescribed number of antenna ports comprises one or more than one of at least an indication of resources for bearing a CSI-RS signal, an indication of a respective number of antenna ports, an indication of a respective antenna port multiplexing code, an indication of a subframe structure, or an indication of a scrambling code associated with the CSI-RS signal; taken jointly and severally in any and all permutations.

Example 18 may include a User Equipment for processing CSI-RS signals; the UE comprising a receiver to receive wireless signals relating to at least one CSI-RS signal, and an apparatus of examples 1 to 17 or some other example herein, to process the data associated with the at least one CSI-RS signal.

Example 19 may include an apparatus for generating Channel State Information Reference Sequence (CSI-RS) configuration information; the apparatus comprising circuitry to generate, in response to a selected CSI-RS, spreading code information associated with a spreading code for spreading data units of a CSI-RS across a plurality of predetermined sets of resource elements of at least one resource block, and circuitry to generate resource element information associated with the plurality of predetermined sets of resource elements, the resource element information comprising data associated with resource elements of the plurality of predetermined sets of resources elements designated for carrying spread data units of the CSI-RS.

Example 20 may include the apparatus of example 19 or some other example herein, wherein the spreading code comprises an orthogonal cover code having a predetermined code length of at least 4.

Example 21 may include the apparatus of examples 19 or 20 or some other example herein, in which the plurality of predetermined sets of resource elements are associated with a common antenna port.

Example 22 may include the apparatus of examples 19 or 20 or some other example herein, in which the plurality of predetermined sets of resource elements are associated with a plurality of antenna ports.

Example 23 may include the apparatus of any of examples 19 to 22 or some other example herein, in which CSI-RS configuration information comprises one or more than one of: one or more than one CSI-RS antenna port, one or more than one CSI-RS resource index, one or more than one CSI-RS periodicity, one or more than one subframe structure or offset, one or more than one relative transmit power for a respective CSI-RS, one or more than one layer, or one or more than one scrambling identity taken jointly and severally in any and all permutations.

Example 24 may include an apparatus for processing a Channel State Information Reference Sequence (CSI-RS) configuration information bearing signal; the apparatus comprising circuitry to detect, from the signal, resource element information associated with a plurality of predetermined sets of resource elements, the resource element information comprising data associated with resource elements of the plurality of predetermined sets of resources elements designated for carrying spread data units of a CSI-RS, and circuitry to detect spreading code information associated with a spreading code for spreading data units of the CSI-RS across the plurality of predetermined sets of resource elements of at least one resource block.

Example 25 may include the apparatus of example 24 or some other example herein, wherein the spreading code comprises an orthogonal cover code having a predetermined code length of at least 4.

Example 26 may include the apparatus of examples 24 or 25 in some other example herein, in which the plurality of predetermined sets of resource elements are associated with at least one common antenna port.

Example 27 may include the apparatus of example 26 or some other example, in which the plurality of predetermined sets of resource elements are associated with a plurality of antenna ports.

Example 28 may include the apparatus of any of examples 24 to 27 or some other example herein, in which CSI-RS configuration information comprises one or more than one of: one or more than one CSI-RS antenna port, one or more than one CSI-RS resource index, one or more than one CSI-RS periodicity, one or more than one subframe structure or offset, one or more than one relative transmit power for a respective CSI-RS, one or more than one layer, or one or more than one scrambling identity taken jointly and severally in any and all permutations.

Example 29 may include a method of antenna port multiplexing for non-zero power (NZP) channel state information reference signals (CSI-RS) using at least a predetermined number of (such as, for example, 4 or 8) antenna ports, the method comprising: generating, by a predetermined layer, a prescribed number (such as, for example, two or more) of CSI-RS resource configurations with said predetermined (such as, for example, 4 or 8) antenna ports for output to a user equipment (UE); determining an orthogonal cover code (OCC) having an associated code length associated with the CSI-RS resource configuration; performing, by a predetermined layer, configuration of a subframe configuration and scrambling identities for CSI-RS configurations for the UE; and outputting the NZP CSI-RS resource according to the CSI-RS resource configuration, wherein one or more than one antenna port associated the prescribed number of CSI-RS resource configurations is multiplexed according to the determined OCC.

Example 30 may include the method of example 29 or some other example herein, in which said generating the prescribed number of CSI-RS resource configurations comprises generating two or more CSI-RS resource configurations.

Example 31 may include the method of example 30 or some other example herein, in which said generating two or more CSI-RS resource configurations comprises generating CSI-RS resource configurations for aggregating NZP CSI-RS resource having 4 or 8 antenna ports and configured using higher layer signalling.

Example 32 may include the method of example 31 or some other example herein, in which said generating CSI-RS resource configurations for aggregating NZP CSI-RS resource prescribes 4 or 8 antenna ports.

Example 33 may include the method of examples 1 to 32 or some other example herein, in which said determining an OCC comprises selecting an OCC from one or more than one of 2 (OCC-2), 4 (OCC-4) or 8 (OCC-8).

Example 34 may include the method of any of examples 29 to 33 or some other example herein, comprising applying the determined OCC to the predetermined number of antenna ports.

Example 35 may include the method of example 34 or some other example herein, in which said applying comprises multiplexing the NZP-CSI-RS signal using at least one or more of prescribed adjacent time domain resources, OFDM symbols, or prescribed frequency domain resources (such as, for example, two or more resource elements in the frequency domain).

Example 36 may include the method of any of examples 29 to 35 or some other example herein, in which said generating, by a predetermined layer, a prescribed number of CSI-RS resource configurations with said predetermined number of antenna ports for output to a user equipment (UE) comprises generating a first set of CSI-RS configurations with a first respective number of CSI-RS ports for a respective OCC length, optionally a respective OCC length of 4.

Example 37 may include the method of example 36 or some other example herein, in which the first set comprises CSI-RS configurations 1, 2, 3, 6, 7, 8, 20, 21, 22, 23, 24, 25 and/or the respective number of antenna ports comprises 4 CSI-RS ports.

Example 38 may include the method of any of examples 29 to 37 or some other example herein, in which said generating, by a predetermined layer, a prescribed number of CSI-RS resource configurations with said predetermined number antenna ports for output to a user equipment (UE) comprises generating a second set of CSI-RS configurations with a second respective number of CSI-RS ports.

Example 39 may include the method of example 38 or some other example herein, in which the second set comprises CSI-RS configurations 1, 2, 3, 20, 21, 22 and/or the second respective number of CSI-RS ports comprises 8 CSI-RS ports.

Example 40 may include the method of any of examples 29 to 39 or some other example herein, comprising applying the determined OCC to the predetermined antenna ports using a plurality of adjacent time domain resources (such as, for example, two or more adjacent OFDM symbols) and a plurality (such as, for example, two or more) of frequency domain resources.

Example 41 may include the method of example 40 or some other example herein, in which said applying the determined OCC to the predetermined antenna ports comprises, for a 4 antenna port CSI-RS resource configuration, applying a OCC-4 code to non-adjacent frequency domain resource elements of adjacent time domain resources (such as, for example, OFDM symbols).

Example 42 may include the method of example 40 or some other example herein, in which said applying the determined OCC to the predetermined antenna ports comprises, for an 8 antenna port CSI-RS resource configuration, applying a OCC-4 using a predetermined number (such as, for example, 4) of adjacent resource elements in the time and frequency domains.

Example 43 may include the method of example 40 or some other example herein, in which said applying the determined OCC to the predetermined antenna ports comprises, for an 8 antenna port CSI-RS resource configuration, applying a OCC-8 to a plurality of adjacent resource elements in the time domain and a plurality of non-adjacent resource elements in the frequency domain.

Example 44 may include the method of any of examples 29 to 43 or some other example herein, wherein antenna port numbering in NZP CSI-RS resources is defined by first counting the antenna ports within the CSI-RS resource configuration and then across the aggregated CSI-RS configuration.

Example 45 may include an evolved nodeB (eNB) or apparatus comprising logic to perform a method of any of examples 29 to 44 or some other example herein.

Example 46 may include a method of channel estimation at a User Equipment (UE); the method comprising: receiving an orthogonal cover code (OCC) length associated with antenna port multiplexing for the UE; receiving, from a serving cell, NZP CSI-RS resources configured according to two or more CSI-RS resource configurations with 4 or 8 antenna ports for a user equipment (UE), said CSI-RS resource configurations comprising configuration of a subframe configuration and scrambling identities for CSI-RS configurations for the UE, wherein an antenna port within each CSI-RS configuration is antenna port multiplexed according to a respective signalled OCC length for antenna port multiplexing; and performing channel estimation at the UE using signals received on the NZP CSI-RS resources and in accordance to the NZP CSI-RS resource configurations.

Example 47 may include a user equipment (UE) comprising radio frequency (RF) circuitry to receive NZP CSI-RS signals from an evolved nodeB (eNB); and baseband circuitry to determine a higher layer configuration based on the signalling, and perform a channel estimation using the signals received on the NZP CSI-RS resource and in accordance to the NZP CSI-RS resource parameters according to methods in examples 29 to 44 and 46 or some other example herein.

Example 48 may include an apparatus comprising means to perform one or more elements of any method described herein or in any of examples 29 to 44 and 46 or some other example herein, or any other method or process described herein.

Example 49 may include machine executable instructions to cause, or associated with causing, an electronic device, upon execution of the instructions by one or more than one processor of the electronic device, to perform one or more elements of a method described herein or in any of examples 29 to 44 and 46 or some other example herein, or any other method or process described herein.

Example 50 may include machine readable storage storing machine executable instructions of example 49 or some other example herein.

Example 51 may include an apparatus comprising logic, modules, and/or circuitry to perform one or more elements of any method described herein or in any of examples 29 to 44 and 46 or some other example herein, or any other method or process described herein.

Example 52 may include an apparatus comprising: one or more processors and one or more computer readable media comprising instructions that, when executed by the one or more processors, cause the one or more processors to perform the method, techniques, or process as described herein or in any of examples 29 to 44 and 46 or some other example herein, or portions thereof.

Example 53 may include a method of communicating in a wireless network as shown and/or described herein.

Example 54 may include a system for providing wireless communication as shown and/or described herein.

Example 55 may include a device for providing wireless communication as shown and/or described herein.

Example 56 may include a signal as shown and/or described herein.

Example 57 may include a first Channel State Information Reference Sequence (CSI-RS) bearing signal associated with a first CSI-RS resource configuration comprising a plurality of sets of resource elements associated with respective antenna ports, the CSI-RS having been combined with a spreading code (OCC), having a code length of 4 or more, and having been distributed over predetermined sets of the plurality of sets of resource elements.

Example 58 may include the first CSI-RS bearing signal of example 57 or some other example herein, in which one or more than one set of resource elements are associated with at least a pair of common symbols (such as, for example, OFDM symbols).

Example 59 may include the first CSI-RS bearing signal of example 58 or some other example herein, in which the at least a pair of common symbols are adjacent symbols or the at least a pair of common symbols are non-adjacent symbols Example 60 may include the first CSI-RS bearing signal of examples 57 to 59 or some other example herein, in which one or more than one set of resource elements are associated with at least a pair of subcarriers.

Example 61 may include the first CSI-RS bearing signal of examples 57 to 60 or some other example herein, in which the at least a pair of subcarriers are adjacent subcarriers or the at least a pair of subcarriers are non-adjacent subcarriers.

Example 62 may include the first CSI-RS bearing signal of example 58 or some other example herein, in which at least two or more of the plurality of sets of resource elements are associated with at least a pair of common symbols.

Example 63 may include the first Channel State Information Reference Sequence (CSI-RS) bearing signal of example 57, the CSI-RS having been combined with a further spreading code (OCC), having a code length of 4 or more, and having been distributed over respective predetermined sets of the plurality of sets of resource elements.

Example 64 may include the first CSI-RS bearing signal of example 63 or some other example herein, in which the spreading code and the further spreading code are orthogonal.

Example 65 may include a first Channel State Information Reference Sequence (CSI-RS) bearing signal associated with a first CSI-RS resource configuration comprising a plurality of sets of resource elements associated with respective antenna ports, the CSI-RS having been combined with a plurality of orthogonal spreading codes (OCC), each orthogonal spreading code having a code length of 4 or more, and having been distributed over predetermined sets of the plurality of sets of resource elements.

Example 66 may include a first CSI-RS bearing signal comprising a first CSI-RS multiplexed, using a respective orthogonal cover code (OCC) having a code length of 4 or more, over a plurality of sets of resource elements associated with a respective number of antenna ports according to an associated first CSI-RS resource configuration, and the first CSI-RS multiplexed, using a respective orthogonal cover code (OCC) having a code length of 4 or more, over a plurality of sets of resource elements associated with a respective number of antenna ports according to an associated second. CSI-RS resource configuration. An eNB, UE, device, apparatus or system as described or claimed herein, and/or as expressed in any and all examples, further comprising at least one of:

a display, such as, for example, a touch sensitive display, an input device, such as, for example, one or more than one of a button, a key pad, an audio input, a video input, and/or an output device such as, for example, an audio output, a video output, a haptic device taken jointly and severally in any and all permutations.

As used in this specification, the formulation "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order, which encompasses all permutations of a set of elements. In this example, the set comprises three elements, but could equally well comprise some other number of elements.

It will be understood that the terms "receiving" and "transmitting" encompass "inputting" and "outputting" and are not limited to an RE context of transmitting and receiving radio waves. Therefore, for example, a chip, device or other component for realizing embodiments could generate data for output to another chip, device or component, or have as an input data from another chip, device or component, and such an output or input could be referred to as "transmit" and "receive" including gerund forms, that is, "transmitting" and "receiving", as well as such "transmitting" and "receiving" within an RF context.

It can be appreciated that the above embodiments can be used to realize antenna port multiplexing of CSI-RS such as, for example, NZP CSI-RS.

The invention claimed is:

1. An apparatus for a User Equipment (UE) for processing a Channel State Information Reference Signal (CSI-RS), the apparatus comprising circuitry configured to:
process data associated with the CSI-RS, wherein the CSI-RS is associated with an aggregated plurality of CSI-RS resource configurations, wherein each CSI-RS resource configuration is indicative of multiplexing data that maps respective CSI-RS resources of a physical resource block to a respective plurality of antenna ports, wherein the multiplexing data comprises a respective multiplexing code for each of the respective plurality of antenna ports, and wherein the respective multiplexing codes are indexed according to a numbering of the respective plurality of antenna ports;
demultiplex the data associated with the CSI-RS conveyed using the respective CSI-RS resources according to the aggregated plurality of CSI-RS resource configurations; and
perform a channel estimation using the data associated with the CSI-RS.

2. The apparatus of claim 1, wherein the respective multiplexing codes have an identical prescribed length.

3. The apparatus of claim 2, wherein the identical prescribed length multiplexing code is an orthogonal cover code with a length of at least one of two, four, or eight.

4. The apparatus of claim 1, wherein the CSI-RS is a Non-Zero Power Channel State Reference Signal.

5. The apparatus of claim 1, wherein each respective plurality of antenna ports comprises at least one of four or eight antenna ports.

6. The apparatus of claim 1, wherein the respective CSI-RS resources comprise a plurality of resource elements of the physical resource block.

7. The apparatus of claim 6, wherein the respective CSI-RS resources comprise resource elements having a predetermined distribution in at least one of the time and frequency domains.

8. The apparatus of claim 7, wherein the predetermined distribution in at least one of the time domain and frequency domain comprises at least one or more than one of adjacent or non-adjacent time domain resources or adjacent or non-adjacent frequency domain resources.

9. The apparatus of claim 1, wherein each CSI-RS resource configuration comprises a plurality of sets of CSI-RS resources.

10. The apparatus of claim 9, wherein the plurality of sets of CSI-RS resources comprises at least a first set of CSI-RS resources associated with a first respective number of CSI-RS ports.

11. The apparatus of claim 10, wherein the first respective number of CSI-RS ports comprises four CSI-RS ports.

12. The apparatus of claim 9, wherein the plurality of sets of CSI-RS resources comprises at least a second set of CSI-RS resources associated with a second respective number of CSI-RS ports.

13. The apparatus of claim 1, wherein data associated with each resource configuration comprises one or more than one of: at least an indication of resources for bearing the CSI-RS, an indication of a respective number of antenna ports, an indication of a respective antenna port multiplexing code, an indication of a subframe structure, or an indication of a scrambling code associated with the CSI-RS, taken jointly and severally in any and all permutations.

14. The apparatus of claim 1, wherein the circuitry configured to:
process data associated with the CSI-RS comprises the circuitry configured to:
aggregate the respective CSI-RS resources associated with each respective plurality of antenna ports.

15. The apparatus of claim 14, wherein the aggregation is realized at a higher layer within the UE.

16. The apparatus of claim 1, wherein the data associated with the CSI-RS is modulated using a modulation scheme, wherein the modulation scheme comprises at least one of Quadrature Phase Shift Keying (QPSK), Quadrature Amplitude Modulation (QAM), or Binary Phase Shift Keying (BPSK).

17. An apparatus for generating Channel State Information Reference Signal (CSI-RS) configuration information, the apparatus comprising circuitry configured to:
for each of an aggregated plurality of CSI-RS resource configurations associated with the CSI-RS:
generate spreading code information associated with respective spreading codes for spreading data units of the CSI-RS across a plurality of predetermined sets of resource elements of at least one physical resource block, wherein the plurality of predetermined sets of resource elements correspond to a respective plurality of antenna ports associated with a respective one of the plurality of CSI-RS configurations, and wherein the respective spreading codes are indexed according to a numbering of the respective plurality of antenna ports; and generate resource element information associated with the plurality of predetermined sets of resource elements, the resource element information comprising data associated with resource elements of the plurality of predetermined sets of resources elements designated for carrying spread data units of the CSI-RS.

18. The apparatus of claim 17, wherein the respective spreading codes comprise orthogonal cover codes having a predetermined code length of at least 4.

19. The apparatus of claim 17, wherein the plurality of predetermined sets of resource elements are associated with a common antenna port.

20. The apparatus of claim 17, wherein CSI-RS configuration information comprises one or more of: one or more than one CSI-RS antenna port, one or more than one CSI-RS resource index, one or more than one CSI-RS periodicity, one or more than one subframe structure or offset, one or more than one relative transmit power for a respective CSI-RS, one or more than one layer, or one or more than one scrambling identity, taken jointly and severally in any and all permutations.

21. An apparatus for processing a Channel State Information Reference Signal (CSI-RS) configuration information bearing signal, the apparatus comprising circuitry configured to:

for each of an aggregated plurality of CSI-RS resource configurations associated with the CSI-RS:

detect, from the CSI-RS configuration information bearing signal, resource element information associated with a plurality of predetermined sets of resource elements, the resource element information comprising data associated with resource elements of the plurality of predetermined sets of resources elements designated for carrying spread data units of the CSI-RS, and wherein the plurality of predetermined sets of resource elements correspond to a respective plurality of antenna ports associated with a respective one of the plurality of CSI-RS configurations; and detect spreading code information associated with respective spreading codes for spreading data units of the CSI-RS across the plurality of predetermined sets of resource elements of at least one physical resource block, wherein the respective spreading codes are indexed according to a numbering of the respective plurality of antenna ports.

22. The apparatus of claim 21, wherein the respective spreading codes comprise orthogonal cover codes having a predetermined code length of at least 4.

23. The apparatus of claim 21, wherein the plurality of predetermined sets of resource elements are associated with at least one common antenna port.

* * * * *